United States Patent [19]
Haake

[11] Patent Number: 5,881,198
[45] Date of Patent: *Mar. 9, 1999

[54] MICROACTUATOR FOR PRECISELY POSITIONING AN OPTICAL FIBER AND AN ASSOCIATED METHOD

[75] Inventor: John Martin Haake, St. Charles, Mo.

[73] Assignee: McDonnell Douglas Corporation, St. Louis, Mo.

[*] Notice: The term of this patent shall not extend beyond the expiration date of Pat. No. 5,602,955.

[21] Appl. No.: 799,048

[22] Filed: Feb. 10, 1997

Related U.S. Application Data

[63] Continuation-in-part of Ser. No. 473,106, Jun. 7, 1995, Pat. No. 5,602,955, and a continuation-in-part of Ser. No. 486,242, Jun. 7, 1995, Pat. No. 5,606,635.

[51] Int. Cl.$^6$ ................................................... G02B 6/36
[52] U.S. Cl. ............................................ 385/136; 385/88
[58] Field of Search .............................. 385/88–94, 134, 385/136, 137

[56] References Cited

U.S. PATENT DOCUMENTS

| | | | |
|---|---|---|---|
| 3,836,225 | 9/1974 | Wilde et al. | 385/115 |
| 4,303,302 | 12/1981 | Ramsey et al. | 385/23 |
| 4,357,072 | 11/1982 | Goodfellow et al. | 385/91 |
| 4,523,802 | 6/1985 | Sakaguchi et al. | 385/91 |
| 4,652,081 | 3/1987 | Fatatry | 385/22 |
| 4,679,908 | 7/1987 | Goodwin | 385/91 |
| 4,688,885 | 8/1987 | Poteat et al. | 385/90 |
| 4,701,013 | 10/1987 | Jurczyszyn et al. | 385/15 |
| 4,702,547 | 10/1987 | Enochs | 385/88 |
| 4,720,163 | 1/1988 | Goodwin et al. | 385/90 |
| 4,721,354 | 1/1988 | Kaspar et al. | 385/4 |
| 4,741,796 | 5/1988 | Althaus et al. | 156/272.4 |
| 4,796,975 | 1/1989 | Lukas et al. | 385/50 |
| 4,798,439 | 1/1989 | Preston | 385/91 |
| 4,802,727 | 2/1989 | Stanley | 385/89 |

(List continued on next page.)

FOREIGN PATENT DOCUMENTS

| | | |
|---|---|---|
| 0 187418A2 | 7/1986 | European Pat. Off. . |
| 2 548 390 | 1/1985 | France . |
| 04 234006A | 8/1992 | Japan . |
| 2 128 768A | 8/1983 | United Kingdom . |
| 2 146 841A | 8/1984 | United Kingdom . |
| 2 139 819A | 11/1984 | United Kingdom . |

OTHER PUBLICATIONS

Wilkinson, Kim, Jokerst and Allen, Integration of Thin Film Optoelectronic Devices Onto Micromachined Movable Platforms, *IEEE Photonics Technology Letters*, vol. 6, No. 9, Sep. 1994, pp. 1115–1118.

(List continued on next page.)

*Primary Examiner*—John D. Lee
*Attorney, Agent, or Firm*—Bell Seltzer Intellectual Property Law Group of Alston & Bird LLP

[57] ABSTRACT

A microactuator for precisely positioning an optical fiber, such as in alignment with an optical device, includes an alignment support structure, a carrier movably mounted on the alignment support structure and at least one actuator which bends or deflects in response to a predetermined stimuli to thereby controllably position the carrier and, in turn, an optical fiber mounted on the carrier relative to the alignment support structure. The actuator can include a bimorphic actuator, an asymmetric monomorph, a diaphragm or a comb structure, for example. As a result, the actuator typically deflects in response to electrical or thermal stimuli. The carrier can include the actuator such that upon deflection the actuator is urged against a portion of the alignment support structure and the carrier is correspondingly moved relative to the alignment support structure. Alternatively, the alignment support structure can include the actuator such that upon deflection the actuator is urged against a portion of the carrier and the carrier is correspondingly moved relative to the alignment support structure. By maintaining the alignment support structure in a fixed relation to an optical device, however, the carrier and, in turn, the optical fiber mounted on the carrier can be positioned in precise alignment with the optical device.

41 Claims, 10 Drawing Sheets

U.S. PATENT DOCUMENTS

| | | | |
|---|---|---|---|
| 4,844,577 | 7/1989 | Ninnis et al. | 385/9 |
| 4,867,524 | 9/1989 | Courtney et al. | 385/14 |
| 4,934,778 | 6/1990 | Gillett | 385/55 |
| 4,955,683 | 9/1990 | Shiga et al. | 385/88 |
| 5,029,791 | 7/1991 | Ceccon et al. | 248/287.1 |
| 5,080,458 | 1/1992 | Hockaday | 385/14 |
| 5,080,461 | 1/1992 | Pimpinella | 385/65 |
| 5,123,073 | 6/1992 | Pimpinella | 385/59 |
| 5,181,214 | 1/1993 | Berger et al. | 385/34 |
| 5,214,727 | 5/1993 | Carr et al. | 385/22 |
| 5,450,508 | 9/1995 | Decusatis et al. | 385/94 X |
| 5,457,765 | 10/1995 | Suzuki et al. | 385/65 X |
| 5,483,608 | 1/1996 | Yokomachi et al. | 385/22 |
| 5,602,955 | 2/1997 | Haake | 385/136 |
| 5,606,635 | 2/1997 | Haake | 385/53 |

OTHER PUBLICATIONS

International Search Report, PCT/US96/15213, mailed Jun. 6, 1997.

*Piezoelectric Voltage* and *Unimorphs, Bimorphs, and Stacks*, Morgan Matroc, Inc. publication, p. 5 (Mar. 1993).

Melles Griot catalog, *Nanopositioning Technology*, 14 pp. [No Date ].

Melles Griot catalog, *Nanopositioning Technology Guide, Components and Systems for Fiber Optics, Optics, Lasers and Integrated Optics* (1993).

R. Boudreau, et al., High Gain(21 dB) Packaged Semiconductor Optical Amplifiers, *Electronics Letters*, vol. 27, No. 20, Sep. 26, 1991, pp. 1842–1843.

E. J. Murphy, Fiber Attachment for Guided Wave Devices, *Journal of Lightwave Technology*, vol. 6, No. 6, Jun. 1988, pp. 862–871.

A. Rosiewicz, High Reliability Packaging for Fibre Optic Sources,*SPIE*, vol. 717 Reliability Considerations In Fiber Optic Applications, 1986, pp. 63–73.

H. M. Presby and C. A. Edwards, Near 100% Efficient Fibre Microlenses, *Electronic Letters*, 12th Mar. 1992, pp. 582–584.

A. Rogner, W. Ehrfeld, D. Münchmeyer, P. Bley, C. Burbaum and J. Mohr, *LIGA–Based Flexible Microstructures for Fiber–Chip Coupling*, IMM Institut für Mikrotechnik GmbH, 1991, pp. 167–170.

Lynn Haber, *Opto–electronics Bets On Low Cost, Lightwave*, Feb. 1995, pp. 1 and 23.

George Kotelly, *Opto–electronics—High–volume, Low–cost Devices Needed, Lightwave*, Feb. 1995, 1 page.

George Kotelly, Opto–electronics—High–volume, Low–cost Devices Needed, *Lightwave*, Feb. 1995, 1 page.

R. J. Pimpinella, A New Type of Fiber Optic Connector Designed for Military Optical Backplanes, *Proceedings of The 42nd ECTC Conference*, May 18–20, 1992, pp. A61–65.

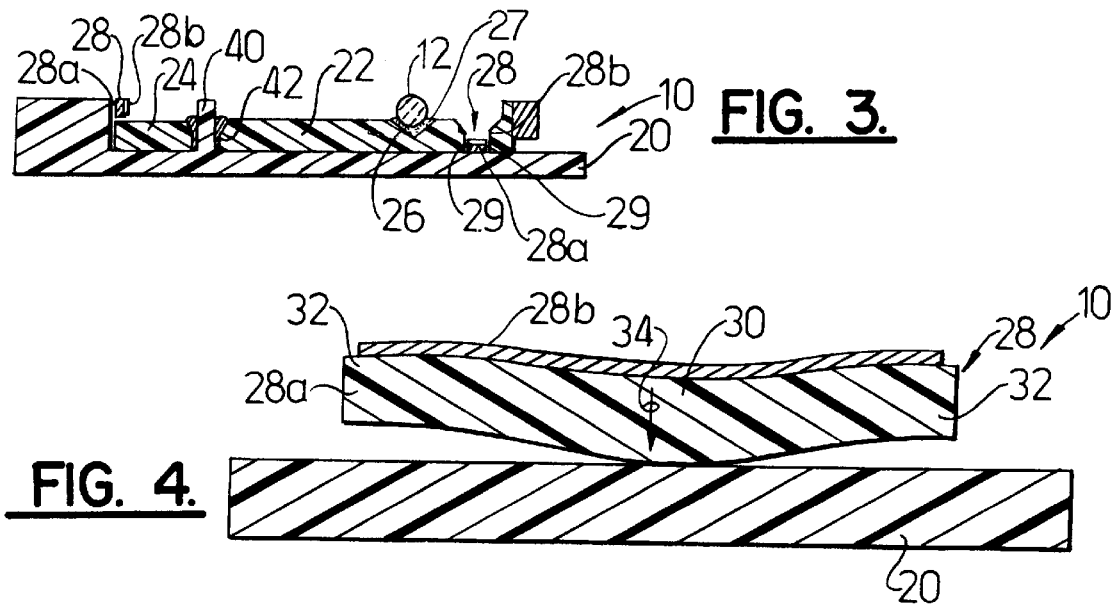
FIG. 3.
FIG. 4.
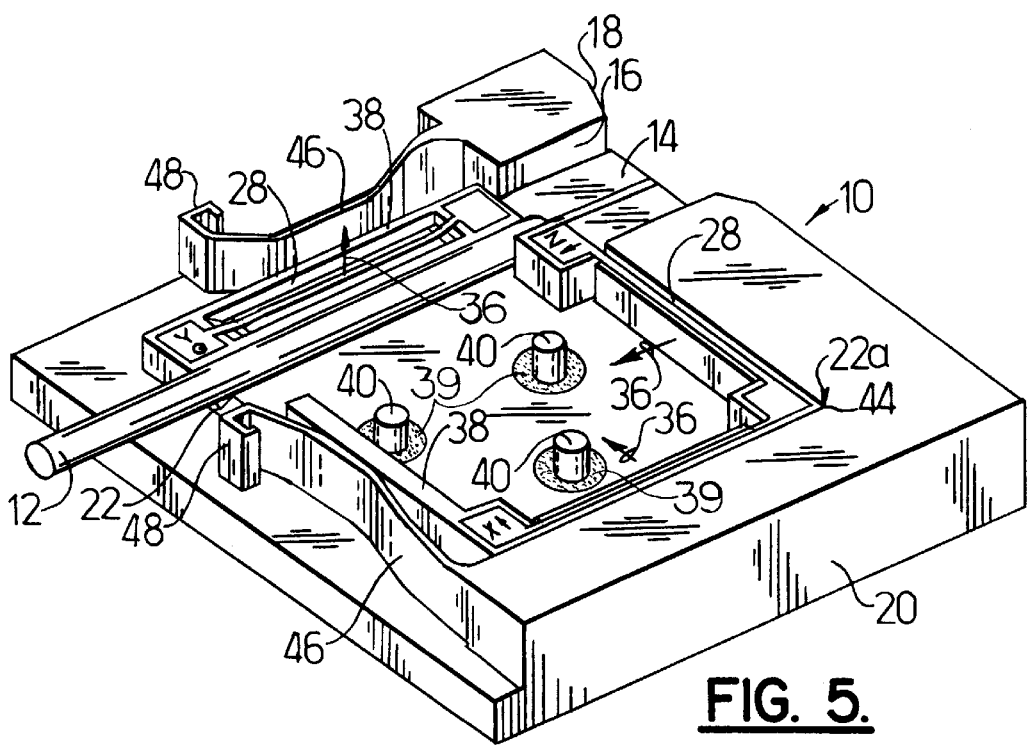
FIG. 5.

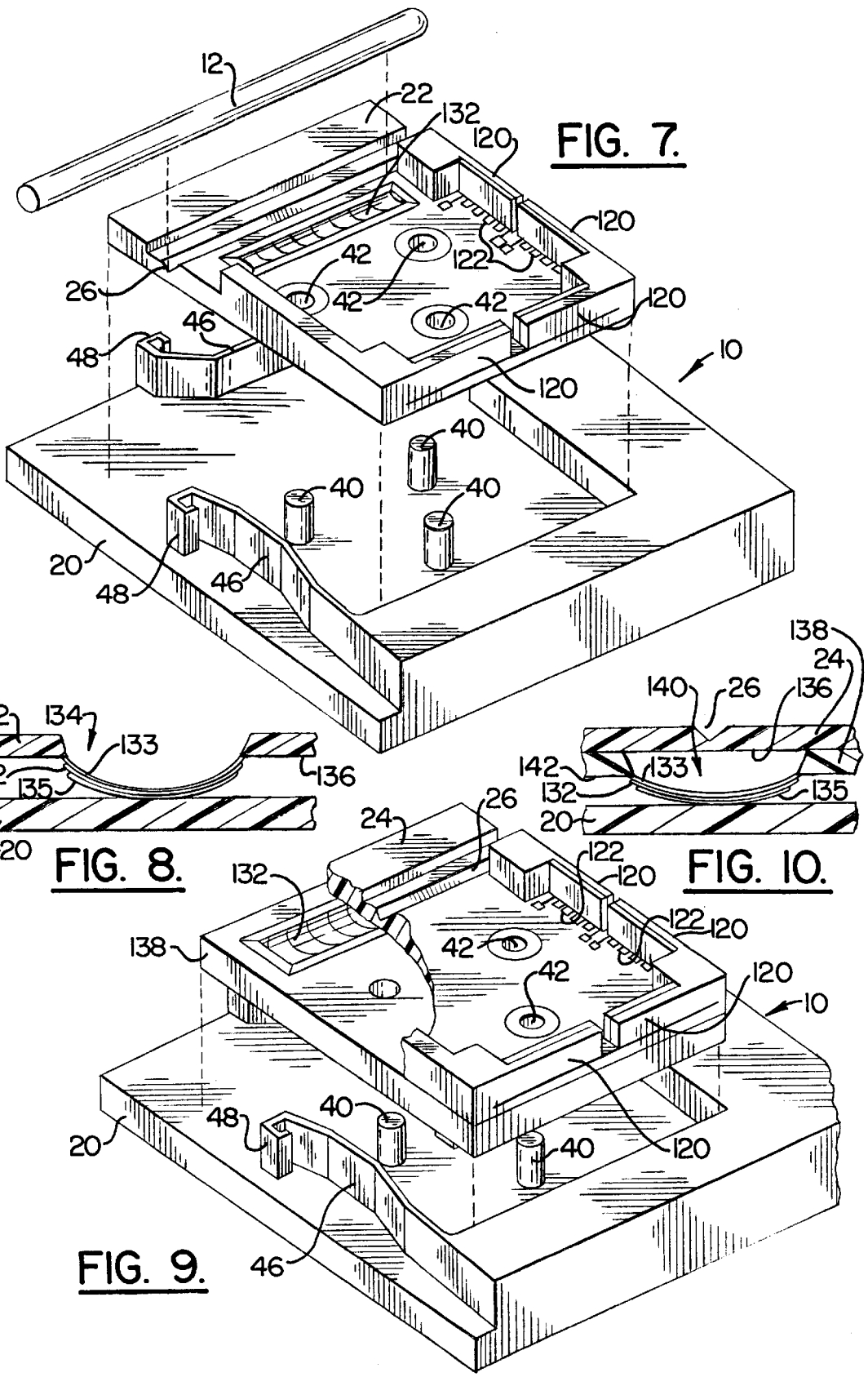

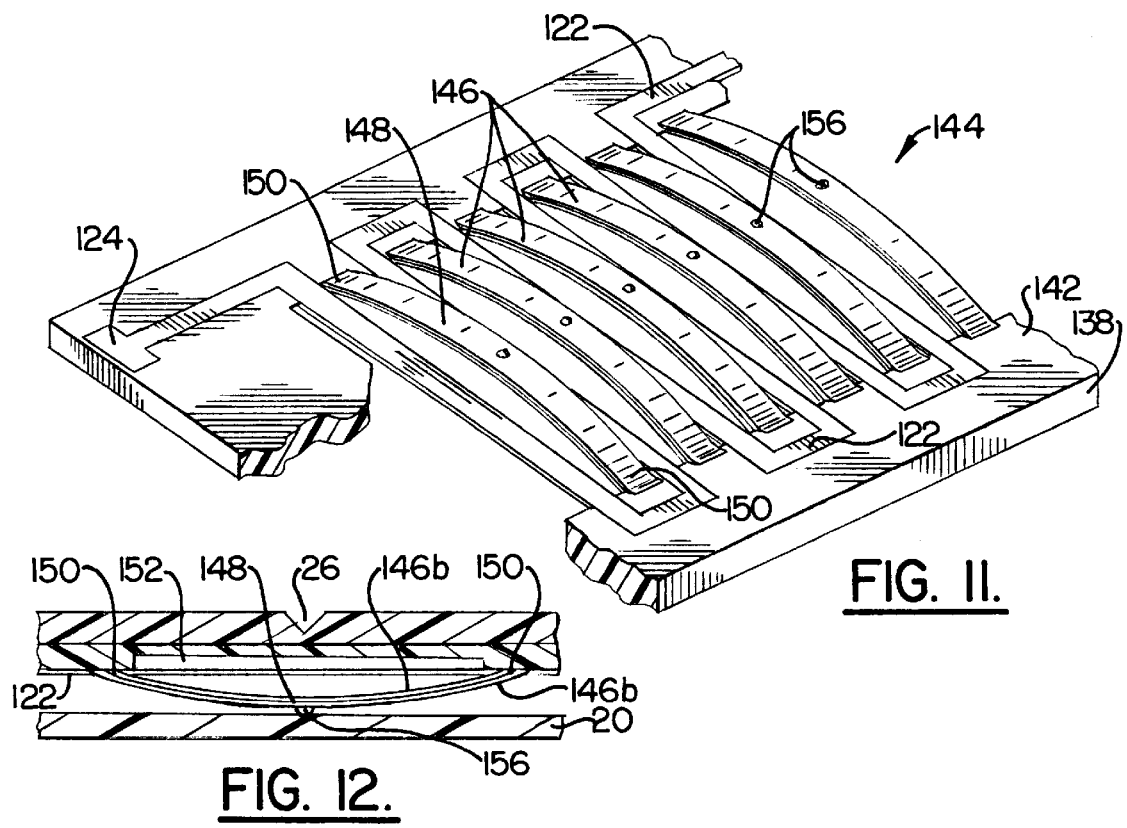
FIG. 11.
FIG. 12.
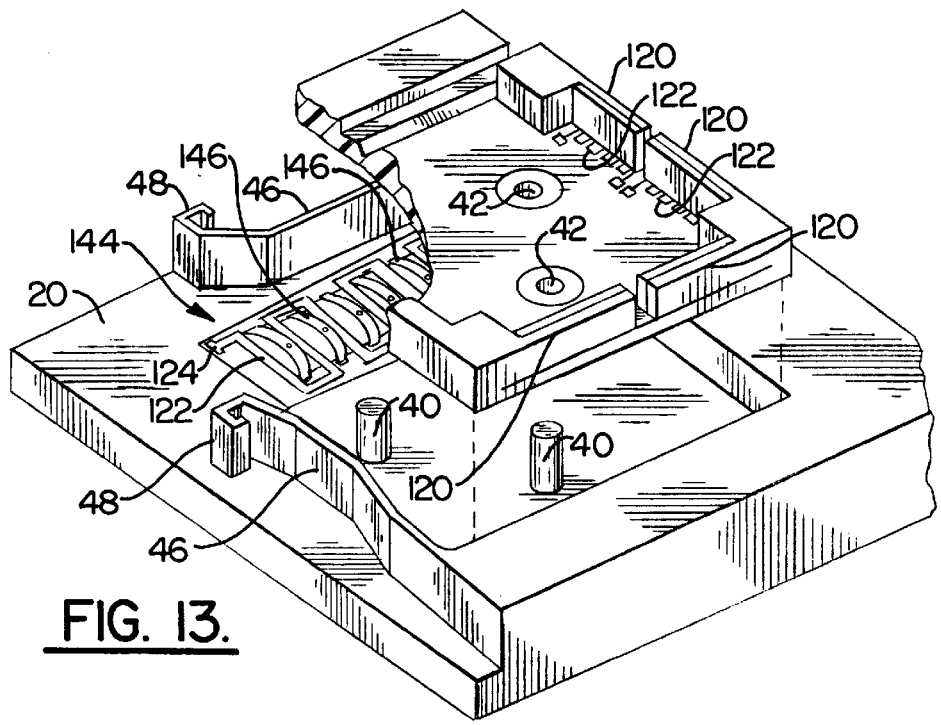
FIG. 13.

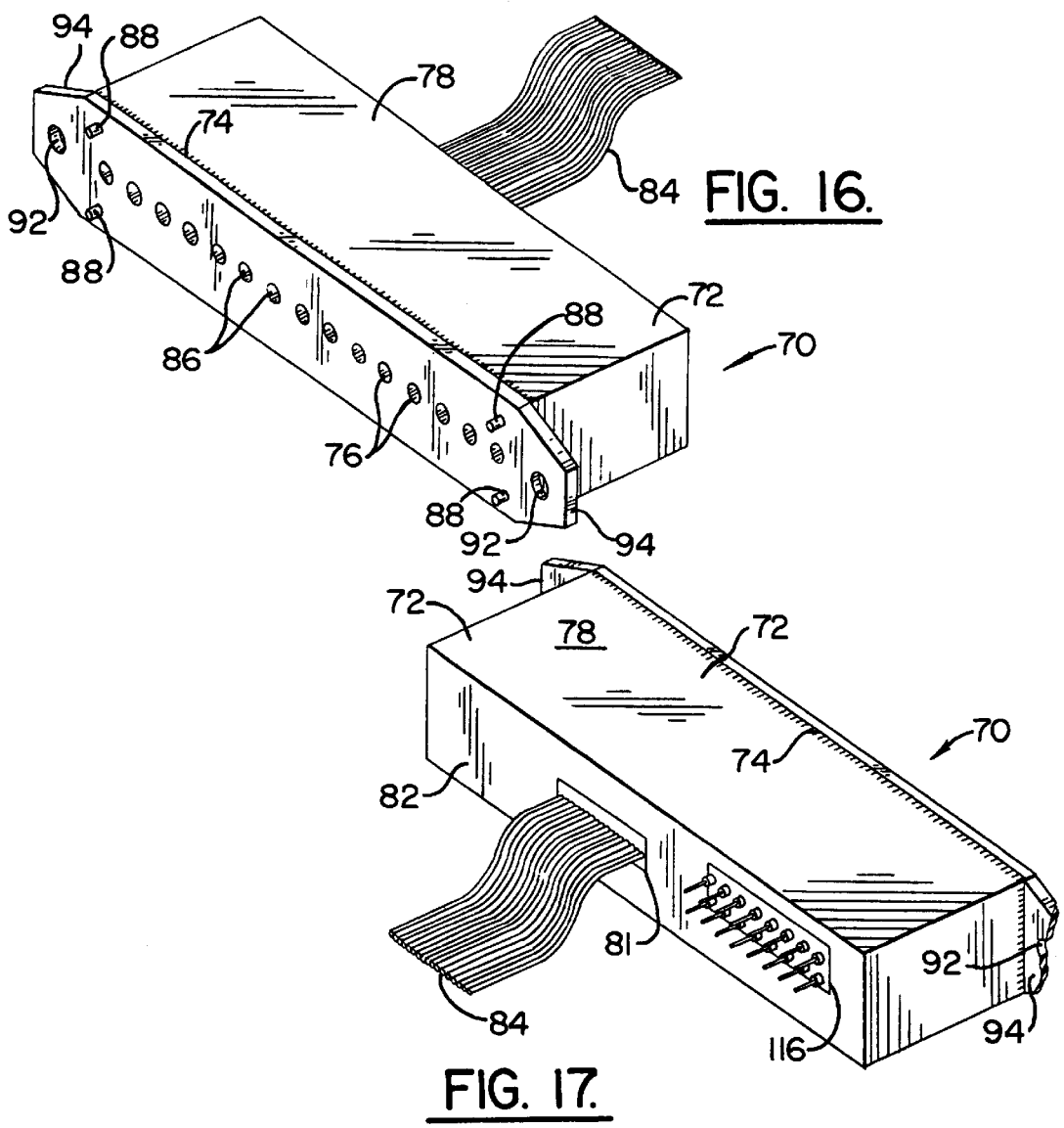
FIG. 16.
FIG. 17.
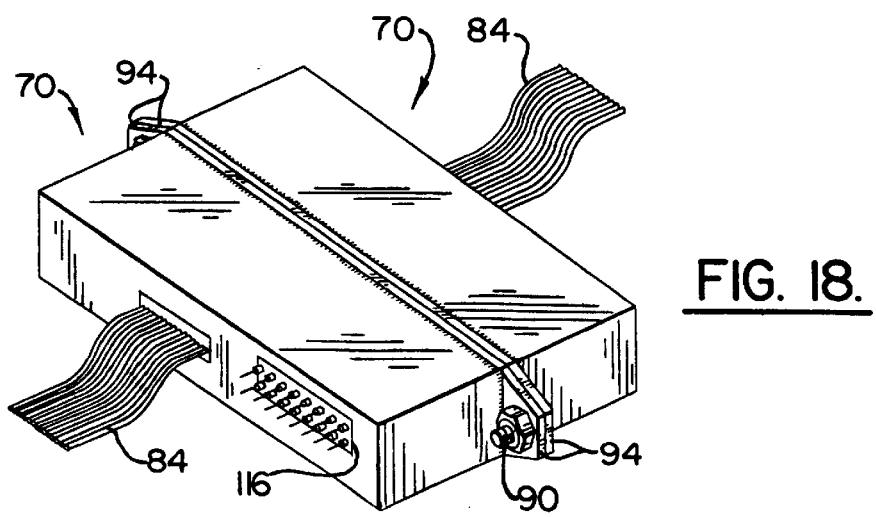
FIG. 18.

MICROACTUATOR FOR PRECISELY POSITIONING AN OPTICAL FIBER AND AN ASSOCIATED METHOD

RELATED APPLICATIONS

This application is a continuation-in-part of U.S. patent application Ser. No. 08/473,106 filed Jun. 7, 1995 (now U.S. Pat. No. 5,602,955) and U.S. patent application Ser. No. 08/486,242 filed Jun. 7, 1995 (now U.S. Pat. No. 5,606,635), the contents of which are expressly incorporated in their entirety herein.

GOVERNMENT RIGHTS

The United States Government has rights in this invention pursuant to a contract awarded by the Department of the Army.

FIELD OF THE INVENTION

The present invention relates generally to methods and apparatus for controllably positioning an optical fiber and, more particularly, to a microactuator for precisely positioning an optical fiber.

BACKGROUND OF THE INVENTION

It is oftentimes desirable to align optical fibers with an electro-optic device, such as a laser diode. Such alignment is particularly desirable in order to maximize the percentage of light coupled from the light source or electro-optic device to the optical fiber and to thereby increase the transmission efficiency of the optical signals. However, the alignment of optical fibers is complicated by the relatively small sizes of both the optical fiber waveguide, such as a single mode optical fiber which, for example, can have a light transmitting core diameter of approximately 2–10 micrometers, and the light source which has approximately the same size.

The alignment of an optical fiber is further complicated since an optical fiber generally has six degrees of freedom, each of which must be separately aligned. In particular, an optical fiber must generally be aligned in three translational directions, i.e., the X, Y and Z directions, and three rotational directions, i.e., $\theta_X$, $\theta_Y$ and $\theta_Z$. Furthermore, the alignment of polarization preserving or polarization maintaining optic fibers is complicated by the need to maintain the polarization axis of the optical fibers in alignment with that of the polarized optical system.

Notwithstanding these difficulties, various methods have been proposed to align a single optical fiber with a variety of electro-optic devices. See, for example, U.S. Pat. Nos. 4,955,683 which was issued Sep. 11, 1992, to Nobuo Shiga, et al. and is assigned to Sumitomo Electric Industries, Ltd.; 4,798,439 which was issued Jan. 17, 1989, to Keith Preston and is assigned to British Telecommunications, PLC; 4,741,796 which was issued May 3, 1988, to Hans Althaus, et al. and is assigned to Siemens Aktiengesellschaft; 4,702,547 which was issued Oct. 27, 1987, to R. Scott Enochs and is assigned to Tektronix, Inc.; U.K. Patent Application GB 2,128,768 which was published May 2, 1984, and is assigned to Hitachi Ltd.; and U.K. Patent Application GB 2,146,841 which was published Apr. 24, 1985, and is assigned to Hitachi Ltd.

As illustrated by these patents and known to those skilled in the art, individual metallized optical fibers can be soldered to a support. In order to position the optical fiber, the solder bonding the metallized optical fiber to the support is generally heated to a temperature above the predetermined melting temperature of the solder. Thereafter, the optical fiber can be moved and, once the optical fiber is properly positioned, the solder can be allowed to cool and resolidify to fix the position of the optical fiber relative to the support and, more importantly, to a light source. These systems typically require, however, some means, such as solder, for retaining an optical fiber in place after the optical fiber has been positioned in a separate alignment process, distinct from the means for retaining the optical fiber in position.

In particular, U.S. Pat. No. 4,798,439 to Keith Preston (hereinafter the "'439 patent") describes an optical assembly and a related method for mounting optical components, such as an optical fiber, on a substrate. According to the '439 patent, an optical fiber is lowered into a layer of solder, such as a solder preform or a solder paste, which has been applied to a submount assembly. Thereafter, a heating element is lowered into contact with the solder to locally melt the solder about the optical fiber such that the optical fiber can be mounted therein. During the mounting process, a first end of the optical fiber is positioned to receive the output of a laser, also illustratively mounted on the submount assembly. By positioning the optical fiber such that the power level of the light transmitted through the optical fiber is maximized, the optical fiber is appropriately aligned with the laser. Once aligned, the heating element is cooled to allow the solder to solidify and to fix the optical fiber to the submount assembly.

Another method of positioning an optical fiber is described in U.S. Pat. No. 4,741,796 to Hans Althaus, et al. (hereinafter the "'796 patent"). In particular, the '796 patent describes a method for aligning an optical fiber with a laser diode. According to this method, an electrically conductive body having a groove defined therein is bonded to a base. An optical fiber extends through the groove and is bonded to the electrically conductive body with a bonding agent. By inducing current flow through the electrically conductive body, the temperature of the electrically conductive body is increased such that the optical fiber is positionable within the bonding agent. After properly positioning the optical fiber relative to the laser diode, the current flow is stopped to cool and solidify the bonding agent, thereby fixing the position of the optical fiber.

While the above-described alignment and bonding systems may controllably position an individual optical fiber, the heat required to allow one optical fiber to be positioned can oftentimes affect the position or alignment of adjacent optical fibers, thereby misaligning the adjacent optical fibers. In addition, these alignment and bonding systems and methods, such as the systems disclosed by the '439 patent and the '796 patent, are generally relatively laborious and time-intensive, particularly, in instances in which a number of optical fibers must be individually aligned.

Accordingly, several commercial alignment systems have been developed to automatically connect, or pigtail, an opto-electronic device, such as a laser diode, to an optical fiber. For example, Melles Griot has developed a system for precisely aligning optical fibers with other optical components. As known to those skilled in the art, however, the Melles Griot alignment system generally includes a variety of relatively complex and costly components which significantly increase the fabrication costs to produce such precisely aligned optical devices. In addition, once the optical fiber has been aligned by a Melles Griot alignment system, the optical fiber must generally be bonded with a separate bonding means, such as solder, as described in the foregoing patents.

One particular application that demands precise alignment of one or more optical fibers involves fiber optic connectors. Fiber optic connectors are commonly employed to align and to interconnect one or more optical fibers with a variety of optical devices or with other optical fibers. For example, fiber optic connectors can be mounted on end portions of a pair of fiber optic cables, each of which include a number of optical fibers. The optical fibers of the fiber optic cables can, for example, transmit data or control signals between various remote devices, such as sensors or actuators, and a central control computer, such as a flight controller of an aircraft. The fiber optic connectors can then be interconnected such that the optical fibers of a first fiber optic cable are aligned with the optical fibers of a second fiber optic cable.

In order to efficiently transmit signals between optical fibers, the fiber optic connectors must precisely align the individual optical fibers such that the optical signals transmitted therethrough are efficiently coupled from fiber to fiber. Such alignment is particularly essential in connecting single mode optical fibers which must be precisely aligned with the light-transmitting core of another single mode optical fiber of similar size in order to efficiently transmit optical signals therethrough.

In order to effectively couple optical signals from fiber to fiber, a fiber optic connector must maintain the precise alignment of the individual optical fibers in a predetermined manner such that the optical fibers will remain aligned as the fiber optic connecter is mated with another fiber optic connector or with other types of optical device. Therefore, a variety of methods as described above have been developed to align individual optical fibers prior to sealing the optical fibers within the fiber optic connector. Since fiber optic connectors typically include a plurality of optical fibers, all of which must be precisely aligned, the alignment process must generally be repeated for each optical fiber of the fiber optic connector prior to hermetically sealing the fiber optic connector. As described above, however, the heat required to allow one optical fiber to be positioned can oftentimes affect the position or alignment of adjacent optical fibers, thereby misaligning the adjacent optical fibers. In addition, these alignment and bonding systems and methods are generally relatively laborious and time-intensive, particularly, in instances in which a number of optical fibers must be individually aligned within the small volume of a single fiber optic connector.

More specifically, a fiber optic connector has been developed by AT&T Bell Laboratories and is described by R. J. Pimpinella in an article entitled "*A New Type of Fiber Optic Connector Designed for Military Optical Backplanes*", published in the Proceedings of the 42nd ECTC Conference on May 18–20, 1992, pages A-6-1 through A-6-5. This fiber optic connector includes a silicon base which defines a v-groove. An optical fiber can be positioned within the v-groove and a ball lens can be disposed adjacent an end portion of the optical fiber to form an optical fiber sub-assembly. The optical fiber sub-assembly can be mated with a second optical fiber sub-assembly, also comprised of an optical fiber and a ball lens mounted to a silicon base, such that the optical signals transmitted by a first optical fiber are collimated by the pair of ball lenses so as to be efficiently coupled to the second optical fiber. In order to prevent unnecessary exposure of the optical fiber to potentially harmful environmental influences, the optical fiber sub-assemblies can be disposed within respective self-sealing connector enclosures. In order to allow the first and second optical sub-assemblies to be mated, however, at least one of the connector assemblies has a spring-loaded cover that retracts upwardly to receive a corresponding portion of the other connector enclosure.

The fiber optic connector disclosed by R. J. Pimpinella as well as the above-described alignment methods and systems do not provide for the precise alignment of one or more optical fibers within a hermetically sealed package, such as a hermetically sealed fiber optic connector. Instead, the retraction of the spring-loaded cover of the connector enclosure of the fiber optic connector disclosed by R. J. Pimpinella can allow contaminants or moisture to enter the connector enclosure. In addition, the fiber optic connector disclosed by R. J. Pimpinella does not provide for realignment of the optical fibers without replacing the silicon bases in which respective v-grooves are defined. Further, the fiber optic connector disclosed by R. J. Pimpinella is also relatively difficult due to the recessed areas adjacent the ball lens.

As known to those skilled in the art, the precise alignment of an optical fiber within a hermetically sealed package is complicated since, in addition to precisely aligning the optical fiber in each of the six degrees of freedom, the alignment process must typically be performed without physically contacting or otherwise heating the optical fiber since heat, such as body heat, can cause the optical fiber to move due to thermal expansion, thereby misaligning the optical fiber. In addition, access to an optical fiber within a hermetically sealed package is generally limited since the optical device with which the optical fiber is being aligned is disposed within an internal cavity defined within the hermetic package.

SUMMARY OF THE INVENTION

These and other shortcomings are overcome by the microactuator of the present invention which precisely positions an optical fiber, such as in alignment with an optical device, without physically contacting or heating the optical fiber. As a result, the microactuator can precisely position an optical fiber within a relatively small optical package, such as a hermetically sealed fiber optic connector. In this regard, the microactuator can precisely position an optical fiber within an optical package, such as a fiber optic connector, without requiring relatively large, external alignment systems.

The microactuator includes an alignment support structure and a carrier, movably mounted to the alignment support structure, for holding the optical fiber in a fixed relation thereto. By securing the optical fiber to the carrier, the optical fiber is rotationally aligned in the $\theta_X$, $\theta_Y$ and $\theta_Z$ directions with respect to the carrier and, in turn, to the alignment support structure and any optical devices mounted upon the alignment support structure. In addition, the optical fiber can be secured to the carrier so that the polarization axis of the optical fiber is appropriately aligned with other portions of a polarized optical system.

The microactuator also includes at least one actuator which deflects in a predetermined direction in response to a predetermined stimuli, such as electrical or thermal stimuli, such that the carrier can be controllably located relative to the alignment support structure. In one embodiment, the carrier includes at least one actuator which is operably urged against a portion of the alignment support structure upon deflection to thereby move the carrier in a direction opposite the predetermined direction in which the actuator is deflected. In another embodiment, the alignment support structure includes at least one actuator which is operably urged against a portion of the carrier upon deflection to thereby move the carrier in the same predetermined direction in which the actuator is deflected. By controllably positioning the carrier relative to the alignment support structure, the optical fiber can be precisely positioned, such as in alignment with the optical device.

In one advantageous embodiment, the microactuator includes first and second actuators for controllably positioning the carrier in first and second orthogonal directions, respectively, relative to the alignment support structure. The microactuator can also include a third actuator for positioning the carrier in a third direction, orthogonal to the first and second directions. Accordingly, the carrier and the optical fiber mounted to the carrier can be controllably positioned in three orthogonal directions relative to the alignment support structure.

In one embodiment, the actuator is a bimorphic actuator formed of first and second materials having first and second coefficients of thermal expansion, respectively. For example, the bimorphic actuator can include a first layer of silicon and a second layer of a metal. The microactuator of this embodiment can also include current supply means for passing current through the bimorphic actuator such that the first and second materials differentially expand, thereby deflecting the respective bimorphic actuator. Alternatively, the microactuator of this embodiment can include a thin film heater for thermally stimulating the bimorphic actuator.

In another embodiment, the second layer of the bimorphic actuator is formed of a piezoelectric material, such as PZT or PMN, which deflects in response to electrical stimuli. Alternatively, the second layer of the bimorphic actuator can be formed of a shape memory alloy material which deflects in response to thermal stimuli. As a result, the microactuator of this alternative embodiment can also include a thin film heater for thermally stimulating the bimorphic actuator.

Each actuator, such as each bimorphic actuator, can include an elongate central portion extending between opposed end portions. The opposed end portions can be affixed to the carrier such that the elongate central portion bends in response to the predetermined stimuli, such as current or heat which induces differential expansion between the first and second layers. Alternatively, each actuator can include first and second elongate actuator portions. Each actuator portion extends from a respective end portion which is affixed to the carrier. According to this embodiment, both actuator portions deflect in the same predetermined direction in response to the predetermined stimuli so as to be operably urged against the alignment support structure, thereby causing the carrier to move relative to the alignment support structure.

In yet another embodiment, the actuator can include a U-shaped asymmetric monomorph. The asymmetric monomorph has first and second portions which form opposite legs of the U-shaped structure. The first and second portions have different cross-sectional areas which at least partially define the first and second resistances of the first and second portions, respectively. Notably, however, the respective resistances defined by the first and second portions are unequal such that the asymmetric monomorph deflects in the predetermined direction in response to the differential joule heating of the first and second portions as current passes therethrough. For example, the second portion may have a larger cross-sectional area than the first portion. By orienting the asymmetric monomorph such that the second portion is closer to the alignment support structure than the first portion, the asymmetric monomorph of this exemplary embodiment will deflect in a direction toward the alignment support structure in response to the predetermined stimuli.

In another embodiment, the actuator can include a diaphragm which deflects in the predetermined direction in response to a predetermined stimuli. For example, the diaphragm can be formed of a piezoelectric material which deflects in response to electrical stimuli. Alternatively, the diaphragm can be formed of a shape memory alloy material which deflects in response to thermal stimulation. Regardless of the material forming the diaphragm, either the alignment support structure or the carrier can include the diaphragm. In either embodiment, however, the diaphragm is disposed such that deflection of the diaphragm controllably moves the carrier relative to the alignment support structure and, as a result, precisely positions the optical fiber.

Alternatively, the actuator can include a comb structure which deflects in the predetermined direction in response to thermal stimuli. The comb structure includes a number of bimorphic members disposed to deflect in the same predetermined direction in response to thermal stimuli. Each bimorphic layer is generally formed of two or more material layers including, in one advantageous embodiment, a layer formed of shape memory alloy. In addition, a central portion of each bimorphic member can include an outwardly extend protuberance. The comb structure also includes means for heating the bimorphic members such that the bimorphic members expand in different manners and deflect to thereby controllably position the carrier relative to the alignment support structure. For example, the bimorphic members can be spaced apart and can extend in a parallel relationship. According to this advantageous embodiment, the heating means can include a circuitous thin film heater which extends between adjacent ones with a bimorphic member. While either the alignment support structure or the carrier can include the comb structure, the comb structure is disposed such that deflection of the bimorphic members controllably moves the carrier relative to the alignment support structure such that the optical fiber is precisely positioned.

Accordingly, the microactuator of the present invention precisely positions an optical fiber, such as a single mode optical fiber, due to the controlled deflection of the actuator (s). For example, the microactuator can precisely align an optical fiber with an optical device, such as a laser diode. In addition, during the process of aligning the optical fiber, the microactuator does not heat or otherwise perturb adjacent microactuators or the optical fibers carried by the adjacent microactuators such that a plurality of adjacent optical fibers can be precisely aligned. Moreover, since the actuators of the microactuator do not physically contact the optical fiber, the microactuator can precisely align an optical fiber with an optical device within a hermetically sealed package. In addition, the microactuator can be readily fabricated in an economical manner. Thus, the microactuator can remain within a hermetically sealed package to facilitate subsequent realignment or repositioning of the optical fiber. Alternatively, the microactuator can permanently bond an optical fiber in an aligned relationship with the optical device.

BRIEF DESCRIPTION OF THE DRAWINGS

FIG. 3 is a cross-sectional view of the microactuator in one embodiment of the present invention taken along line 3—3 of FIG. 1.

FIG. 4 is a cross-sectional view of a microactuator according to one embodiment of the present invention taken along line 4—4 of FIG. 1.

FIG. 5 is a perspective view illustrating the deflection of a bimorphic actuator and the resulting movement of the carrier relative to the alignment support structure of the microactuator of one embodiment of the present invention.

FIG. 7 is an exploded perspective view of a microactuator of yet another embodiment which includes a diaphragm mounted to the lower surface of the carrier body and adapted to deflect or bow downwardly toward the alignment support structure.

FIG. 8 is a cross-sectional view of the microactuator of FIG. 7 which illustrates a diaphragm which is deflected or bowed downwardly toward the alignment support structure.

FIG. 9 is an exploded perspective view of a microactuator of another embodiment which includes a diaphragm mounted to the lower surface of a wafer which is thereafter attached or bonded to the lower surface of the carrier body to form the carrier.

FIG. 10 is a cross-sectional view of the microactuator of FIG. 9 in which the microactuator is deflected or bowed downwardly toward the alignment support structure.

FIG. 11 is a perspective view of the lower surface of a wafer having a comb structure formed thereon such that the wafer can thereafter be attached or bonded to the lower surface of the carrier body to form the carrier of another embodiment of the present invention.

FIG. 12 is an assembled cross-sectional view of a microactuator incorporating the carrier of FIG. 11 which illustrates the bimorphic members of the comb structure in a deflected or bowed state.

FIG. 13 is an exploded perspective view of a microactuator of another embodiment which includes an alignment support structure having a comb structure with a number of bimorphic members adapted to deflect or bow upwardly toward the carrier in order to precisely position the optical fiber.

FIG. 16 is a front perspective view of a fiber optic connector according to one embodiment of the present invention.

FIG. 17 is a rear perspective view of a fiber optic connector according to one embodiment of the present invention.

FIG. 18 is a perspective view of a pair of fiber optic connectors according to our embodiment of the present invention which have been mated in an aligned relation.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
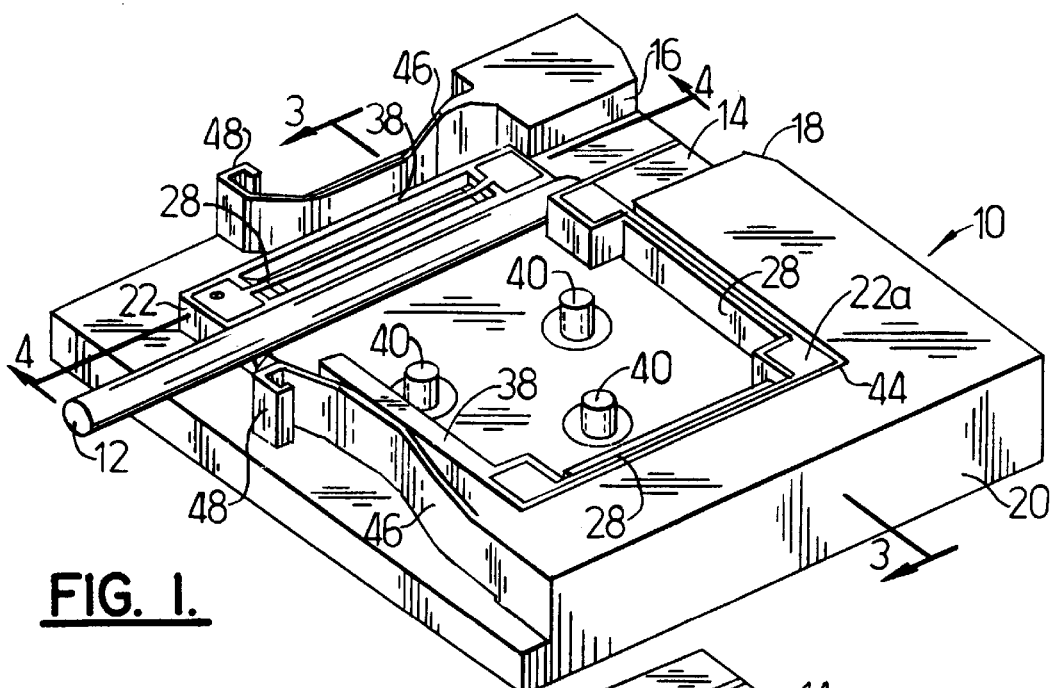
FIG. 1 is a perspective view illustrating a microactuator according to one embodiment of the present invention.

Referring now to FIG. 1, a microactuator 10 for precisely positioning an optical fiber 12 according to one embodiment of the present invention is illustrated. For example, the microactuator can align the optical fiber with an optical device 14, such as a laser diode, which is held within a corresponding recess 16 defined by the microactuator. Alternatively, the microactuator can precisely align an optical fiber with an external optical device, i.e., an optical device which is not mounted upon or otherwise held by the microactuator. In either instance, however, the microactuator is positioned in a fixed relation to the optical device. Still further, the microactuator can form one portion of a fiber optic connector that includes one or more microactuators for aligning respective optical fibers, such as with the corresponding optical fibers of another fiber optic connector.

The microactuator 10 can position various types of optical fibers 12 including multi-mode, single mode, and polarization preserving optical fibers. However, the microactuator of the present invention is particularly adapted to position single mode optical fibers in an aligned position since the microactuator can readily position optical fibers with the precision required to efficiently couple single mode optical fibers. In addition, the microactuator can align an optical fiber which includes a lensed facet. However, the microactuator can, alternatively, align an optical fiber having a cleaved end facet without departing from the spirit and scope of the present invention.

Figure 2:
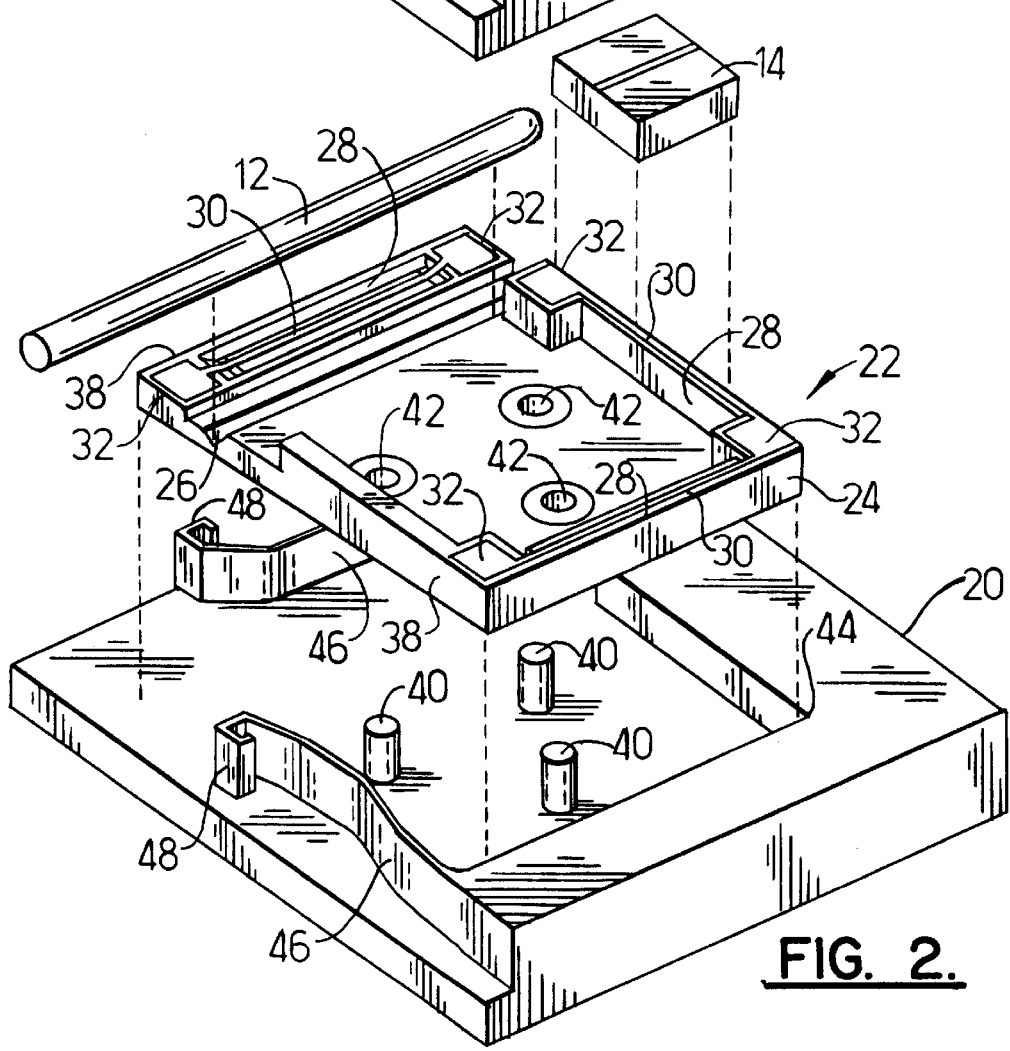
FIG. 2 is an exploded perspective view illustrating the microactuator of FIG. 1 including the alignment support structure and the carrier in greater detail.

The microactuator 10 generally includes an alignment support structure 20, such as a substrate, as illustrated in FIGS. 1 and 2. The alignment support structure is typically disposed in a fixed relation to the optical device 14. For example, the alignment support structure can include a recessed portion 16 which is adapted to receive and hold the optical device. As illustrated in FIGS. 1 and 2, a laser diode can be disposed within the recessed portion defined by the alignment support structure. As also shown, the alignment support structure of this embodiment can include a chamfered opening 18 so as to reduce or eliminate back reflections from the optical device.

The alignment support structure 20 is preferably comprised of a thermally conductive material to serve as a heatsink for drawing heat from the optical device 14 as described hereinafter. In addition, once the carrier 22 has been bonded to the alignment support structure, the alignment support structure also draws heat from the carrier. By drawing heat from the optical device and the carrier, the carrier and, in turn, the optical fiber 12 can be maintained at a predetermined constant temperature such that the alignment of the optical fiber is not altered or otherwise affected due to temperature fluctuations. In one exemplary embodiment, the alignment support structure is comprised of a metallic material, such as copper or nickel. Alternatively, the alignment support structure can be formed of a non-metallic material, such as silicon.

The alignment support structure 20 can be fabricated by a variety of processes as known to those skilled in the art. For example, the alignment support structure can be electroformed, such as by a LIGA process, in order to obtain relatively large height-to-width ratios. By obtaining relatively large height-to-width ratios, the alignment support structure can include vertical sidewalls having precise tolerances. As known to those skilled in the art, a LIGA process is based upon a combination of lithography, electroforming and molding. In fact, the acronym LIGA is derived from the German translation of lithography, electroforming and molding, namely, Lithografie, Galvanoformung and Abformung. Alternatively, an alignment support structure formed of silicon can be fabricated by reactive ion beam etching without departing from the spirit and scope of the present invention.

The microactuator 10 also includes a carrier 22, movably mounted to the alignment support structure 20, for holding the optical fiber 12 in a fixed relation thereto. As shown in FIG. 2, the carrier 22 preferably includes a carrier body 24 having an optical fiber holding means, such as a groove 26 defined in the carrier body, for receiving and holding the optical fiber in a fixed relation to the carrier body. As illustrated in cross-section in FIG. 3, the groove can be V-shaped and, in one embodiment, has opposed sidewalls which define an angle of 550 with respect to the surface of the carrier body. However, the groove can have a variety of other cross-sectional shapes without departing from the spirit and scope of the present invention.

In one embodiment, the carrier 22 is comprised of silicon. Thus, the V-shaped groove 26 can be formed by anisotropically wet etching the carrier body. However, the carrier can be comprised of other materials, such as metallic materials, without departing from the spirit and scope of the present invention. In addition, the carrier can be coated with a material having a relatively low coefficient of friction, such as a TEFLON® coating.

The V-shaped groove 26 preferably has a predetermined depth such that the optical fiber 12 will initially be held slightly below, such as 5 μm below, the final aligned position of the optical fiber. Thus, the microactuator 10 can controllably adjust the position of the optical fiber upwardly and into alignment with the optical device 14 as described hereinafter. However, the groove can be formed so as to initially hold the optical fiber in other predetermined relationships to the final aligned position of the optical fiber without departing from the spirit and scope of the present invention.

In order to maintain the optical fiber 12 in a fixed relation to the carrier body 24, the optical fiber is preferably bonded within the groove 26. For example, the optical fiber can be bonded to the carrier with an optical fiber bonding agent 27, such as Gould GlasSolder™ bonding agent, or a high temperature fluxless solder, such as gold/tin eutectic alloy solder, as shown in FIG. 3. As known to those skilled in the art, the optical fiber is also preferably metallized, such as with titanium, platinum and gold, in order to be securely bonded within the groove.

Figure 14:
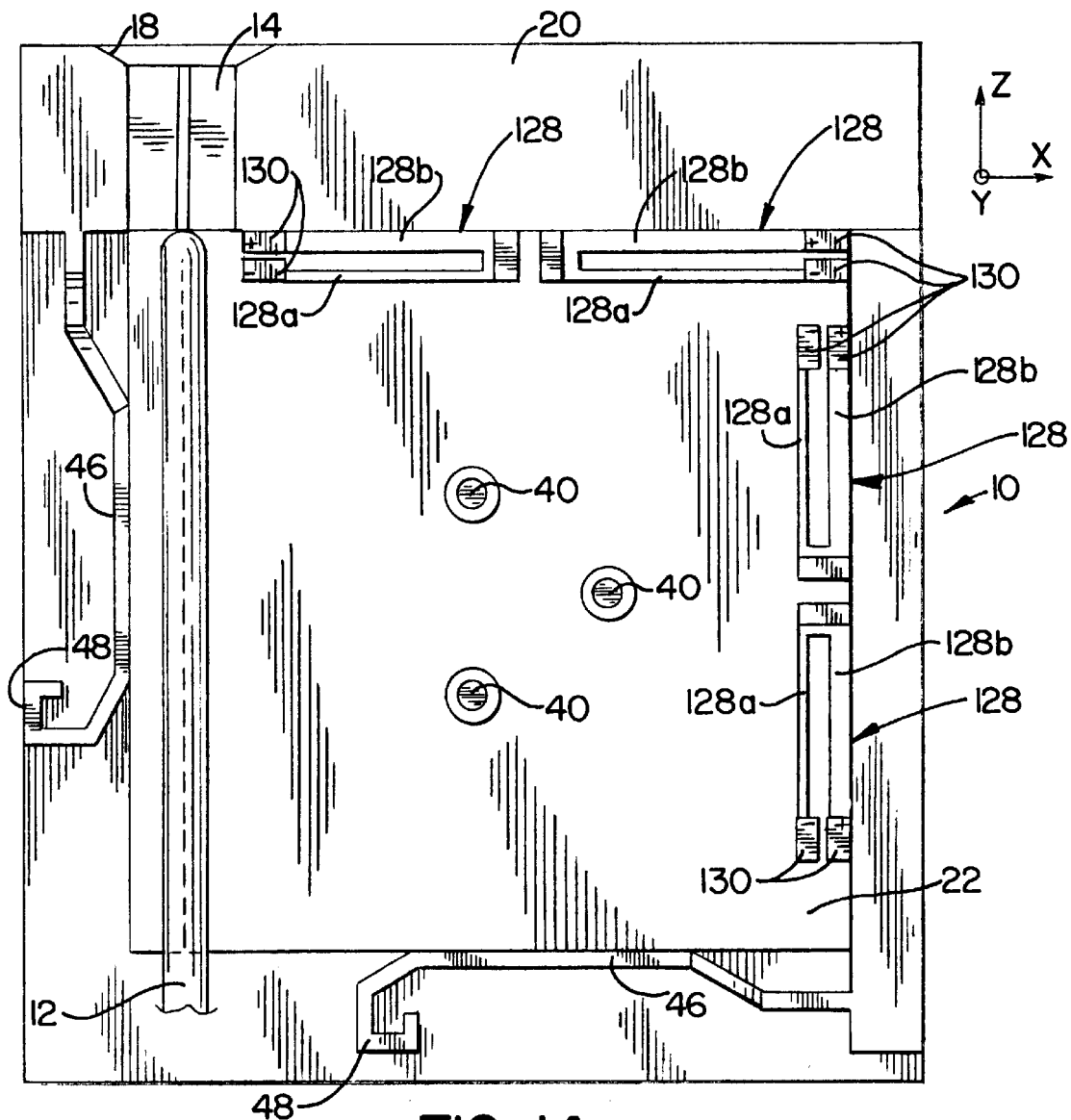
FIG. 14 is an assembled plan view of a microactuator of another embodiment which includes a plurality of asymmetric monomorphic actuators for controllably positioning the carrier relative to the alignment support structure.

The microactuator 10 of the present invention also includes positioning means for controllably positioning the carrier 22 relative to the alignment support structure 20 such that the optical fiber 12 is, in turn, precisely positioned, such as in an aligned relationship with the optical device 14. In one embodiment, the carrier includes the positioning means, including at least one actuator 28, for controllably positioning the carrier and, in turn, the optical fiber. In other embodiments, as shown in FIG. 14, however, the alignment support structure can include the positioning means, including at least one actuator, for precisely positioning the carrier and, in turn, the optical fiber.

As illustrated in FIGS. 3 and 4, the positioning means can include three bimorphic actuators 28. Each bimorphic actuator is preferably comprised of first and second layers 28a and 28b. The first and second layers are formed of first and second materials, respectively, which respond differently to electrical stimuli. Thus, by appropriately stimulating the bimorphic actuator, the bimorphic actuator will deflect in a predetermined direction by a controllable amount. Typically, the amount of the deflection of the bimorphic actuator will be proportional to the magnitude of the stimulation. As described below, the bimorphic actuator will typically be stimulated either electrically or thermally.

According to one embodiment, each bimorphic actuator 28 includes an elongate central portion 30 extending between opposed end portions 32 as shown in FIG. 4. The opposed end portions can be affixed to the carrier body 24 while the elongate central portion is separated from the carrier body as shown in FIG. 3. Alternatively, the opposed end portions can be disposed within slots defined by the carrier body to thereby permit limited relative movement between the opposed end portions and the carrier body. Thus, upon stimulation of the bimorphic actuator, the elongate central portion of the bimorphic actuator will bend in a predetermined direction, such as downwardly as shown in FIG. 5 and as indicated by arrow 34 in FIG. 4. Upon bending in the predetermined direction, the bimorphic actuator is urged against the alignment support structure 20 so as to apply an oppositely directed force to the carrier 22, thereby moving the carrier relative to the alignment support structure. Accordingly, the carrier can be controllably positioned relative to the alignment support structure such that the optical fiber 12 bonded to the carrier is precisely aligned with the optical device 14.

As illustrated, the microactuator 10 of one advantageous embodiment includes three orthogonally positioned bimorphic actuators 28 adapted to move the carrier 22 in three orthogonal directions, namely, the x, y and z directions as designated for purposes of illustration in FIG. 1, relative to the alignment support structure 20. Thus, by appropriately stimulating the respective bimorphic actuators independently, the carrier and, in turn, the optical fiber 12 bonded thereto, can be controllably positioned in each of the three orthogonal directions. In addition, the alignment of the optical fiber with the optical device 14 in all three rotational directions, i.e., ex, $\theta_X$, $\theta_Y$ and $\theta_Z$, and the alignment of the polarization axis of the optical fiber with the optical device is provided by the precise formation of the groove 26 relative to the recessed portion 18 of the alignment support structure which holds the optical device.

According to one embodiment, the first and second layers 28a and 28b of each of the bimorphic actuators 28 are comprised of first and second materials, respectively. The first and second materials of this embodiment are selected to have first and second coefficients of thermal expansion, respectively. For example, the first material can be silicon while the second material is a metal, such as nickel or copper, having a larger coefficient of thermal expansion than the first material. The metallic second layer can be deposited on the first layer by a variety of methods, including preferential sputtering, directed evaporation, electroplating and electroforming, such as by a LIGA process, without departing from the spirit and scope of the present invention.

In this embodiment, the microactuator 10 also preferably includes current supply means for providing current to the bimorphic actuator 28 to resistively heat the bimorphic actuator such that the first and second materials of the first and second layers, respectively, differentially expand, thereby deflecting the bimorphic actuator. In order to facilitate thermal stimulation of the bimorphic actuators, bonding pads, typically comprised of a conductive material, such as gold, are formed on the opposed end portions 32 of the bimorphic actuators such that an electrical current can be passed therebetween. As described hereinbelow in conjunction with other embodiments, the bimorphic actuator can be heated and, in turn, controllably deflected in other manners without departing from the spirit and scope of the present invention.

In other words, since the end portions 32 of the bimorphic actuators 28 are affixed to the carrier body 24 and since the metallic layers expand to a greater degree than the respective silicon layers, the elongate central portions 30 of the bimorphic actuators bend downwardly and outwardly as shown in FIG. 5. The elongate central portions of the first and second bimorphic actuators, i.e., the x- and z-bimorphic actuators, are therefore urged against respective sidewalls of the alignment support structure 20 such that the carrier 22 is moved in a direction away from the sidewalls in response thereto as indicated by arrows 36 in FIG. 5. Likewise, the elongate central portion of the third bimorphic actuator, i.e., the y-bimorphic actuator, is urged downwardly against the alignment support structure such that the carrier is moved upwardly in response thereto as shown in FIGS. 4 and 5. In order to facilitate movement or flexing of the third bimorphic actuator, the elongate central portion is preferably separated from the remainder of the carrier body 24 by relief grooves 29 defined laterally alongside the elongate central portion and through the carrier body as best shown in FIG. 3. By therefore controlling the current supplied to the bimorphic actuators, the amount of the bending or deflection and, consequently, the position of the carrier relative to the alignment support structure can be controlled since the amount of bending is generally proportional to the current supplied to the individual bimorphic actuators.

A bimorphic actuator 28 having a first layer 28a comprised of a highly doped semiconductor material, such as highly doped silicon, can also be heated by introducing current to the highly doped semiconductor material. By introducing current to a first layer comprised of a highly doped semiconductor material, the bimorphic actuator can be resistively heated such that the first and second layers differentially expand, thereby deflecting the bimorphic actuator. In addition, sufficient resistive heating can generally be provided by relatively small amounts of the current, such as 10 mA, thereby reducing the current requirements for the microactuator 10 of this embodiment.

Alternatively, in embodiments in which the metallic second layer 28b of the bimorphic actuator 28 has a relatively low resistance, such as a second layer comprised of nickel, copper, gold or aluminum, the bimorphic actuator can include an additional layer comprised of a material having a greater resistance than that of the metallic second layer. The bimorphic actuator of this embodiment can also include an insulating layer, such as a layer of silicon dioxide, disposed between the metallic second layer and the additional layer having a greater resistance. Thus, by providing current to the additional layer of relatively high resistance, the various layers of the bimorphic actuator will be heated and will differentially expand such that the bimorphic actuator controllably bends or deflects as described above.

In another embodiment, each bimorphic actuator 28 includes a second layer 28b of an electrostrictive or piezoelectric material which, as known to those skilled in the art, will controllably move or deflect upon the application of electrical stimulation. For example, the microactuator 10 of this embodiment also includes voltage supply means for creating a voltage differential across the bimorphic actuator such that the bimorphic actuator controllably deflects. In one exemplary embodiment, the bimorphic actuator includes a first layer 28a comprised of silicon and a second layer comprised of a piezoelectric material, such as PZT or PMN. As known to those skilled in the art, the piezoelectric material can be deposited upon the first layer by a variety of processes, including chemical vapor deposition (CVD). By controlling the voltage difference across the resulting bimorphic actuator, the amount of deflection or bending of the bimorphic actuator and, consequently, the position of the carrier 22 relative to the alignment support structure 20 can likewise be controlled. As described above, bonding pads are preferably disposed on the opposed end portions 32 of the bimorphic actuator such that a predetermined voltage can be established therebetween.

In yet another embodiment, each bimorphic actuator 28 includes a second layer 28b of a shape memory alloy (SMA) material which, as known to those skilled in the art, will controllably move or deflect as the SMA material is heated. Thus, the microactuator 10 of this embodiment also preferably includes current supply means for passing a current through the bimorphic actuator so that the SMA material is resistively heated and the bimorphic actuator controllably deflects. Alternatively, the microactuator of this embodiment can include other means for heating the SMA material and causing the bimorphic actuator to deflect, as described hereinbelow in conjunction with other embodiments. In either embodiment, the SMA material is preferably formed or trained such that heating of the SMA material will cause the bimorphic actuator to deflect in the desired direction.

In one exemplary embodiment, the bimorphic actuator 28 includes a first layer 28a comprised of silicon and a second layer 28b comprised of an SMA material, such as an alloy of nickel and titanium or an alloy of nickel, titanium and copper. While the bimorphic actuator of this embodiment can be formed in a variety of manners without departing from the spirit and scope of the present invention, a thin layer of the SMA material can be sputtered upon the first layer of silicon and can thereafter be annealed. By controlling the heating of the bimorphic actuator, such as by controlling the current passing through the bimorphic actuator, the amount of deflection or bending of the bimorphic actuator and the corresponding movement of the carrier 22 relative to the alignment support structure 20 can likewise be controlled. As described above, bonding pads are preferably disposed on the opposed end portions 32 of the bimorphic actuator such that a predetermined current can be passed therethrough.

Figure 6A:
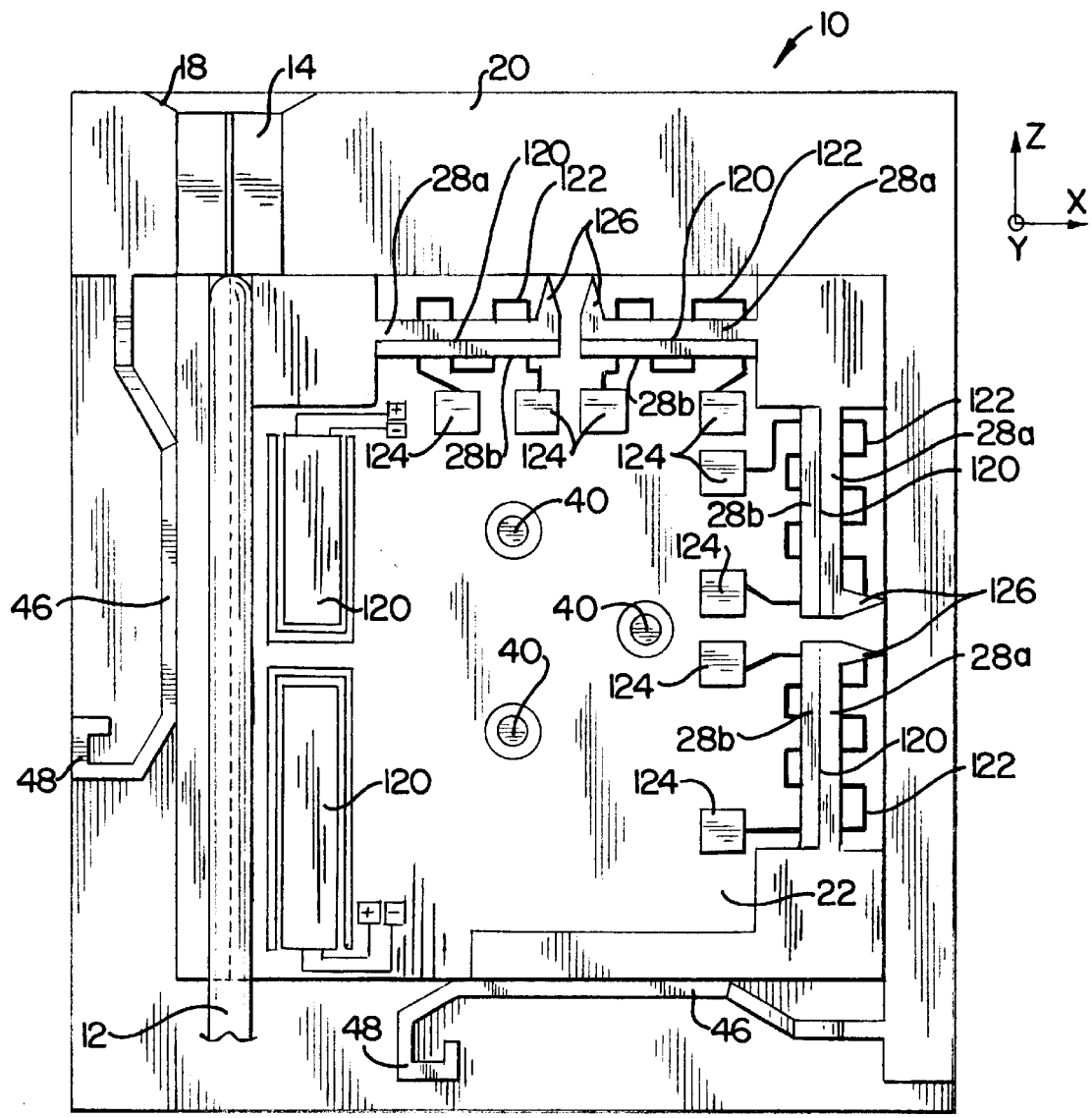
FIG. 6A is an assembled plan view of a microactuator according to another embodiment of the present invention which includes actuators, each of which includes first and second elongate actuator portions.

In contrast to the embodiments described above and illustrated in FIGS. 1–5 which include an elongate central portion 30 extending between opposing end portions 32, the actuators 28 shown in FIG. 6A each include first and second elongate actuator portions 120. The elongate actuator portions of this embodiment extend toward one another from respective end portions which are affixed to the carrier body 24. Other than the affixation of the end portions of the elongate actuator portions to the carrier body, the elongate actuator portions are separate from each other and from the carrier. As shown in FIG. 6A, each elongate actuator portion can have approximately the same length and can extend along approximately one-half of a side of the carrier body. However, the first and second elongate actuator portions can be of different relative lengths without departing from the spirit and scope of the present invention.

As described above, each elongate actuator portion 120 can include first and second layers 28a and 28b which are formed of first and second materials, respectively. For example, the first and second materials can be selected to have first and second coefficients of thermal expansion, respectively. For example, the first material can be silicon while the second material is a metal, such as copper or nickel, having a larger coefficient of thermal expansion than silicon. Alternatively, at least one of the layers can be formed of an SMA material, such as an alloy of titanium and nickel or an alloy of titanium, nickel and copper.

In either embodiment, the elongate actuator portions 120 are preferably deflected in response to thermal stimulation. Accordingly, the microactuator 10 of this embodiment preferably includes means for heating the respective elongate actuator portions. With respect to the elongate actuator portions adapted to move the carrier 22 in the x- and z-directions, for example, the heating means can include a thin film heater 122 disposed upon the carrier body 24 for thermally stimulating a respective elongate actuator portion as shown in FIG. 6A. The thin film heater is typically formed of a thin layer of polysilicon deposited upon the carrier body during the fabrication of the carrier 22. However, the thin film heater can be formed of other materials, such as nickel chromium, vacuum deposited upon the carrier body during the fabrication of the carrier. Regardless of the material, the thin film heater is preferably undercut, at least somewhat, in order to thermally isolate the thin film heater, at least partially, from the carrier.

As also shown in FIG. 6A, the thin film heater 122 preferably traces a circuitous path beneath a respective elongate actuator portion 120 such that current passing through the thin film heater will radiatively heat the respective actuator portion, thereby causing the actuator portion to deflect in a predetermined direction, such as in an outward direction in the embodiment of FIG. 6A, so as to be operably urged against a portion of the alignment support structure 20. In order to facilitate electrical connection with the thin film heater, each of the opposed end portions of the thin film heater can also include a respective bonding pad 124, typically comprised of a conductive material, such as gold.

As also shown in FIG. 6A, each elongate actuator portion 120 can also include a respective tap 126. Each tap extends outwardly from an end portion of a respective actuator portion, opposite the end portion which is affixed to the carrier body 24, in a direction toward the alignment support structure 20. As shown, the tap can be integrally formed with the respective elongate actuator portion. However, the tap can be a separate element which is attached to the end portion of a respective elongate actuator portion, such as by glue or other adhesives without departing from the spirit and scope of the present invention. In either instance, the tap, and not the remainder of the respective actuator portion, contacts the alignment support structure upon deflection of the actuator portion. As a result, the tap serves as a thermal choke to effectively isolate the remainder of the respective actuator portion from the alignment support structure such that the generally cooler temperature of the alignment support structure does not disadvantageously cool the actuator portion which could, in turn, decrease the amount of deflection of the actuator portion.

Figure 6B:
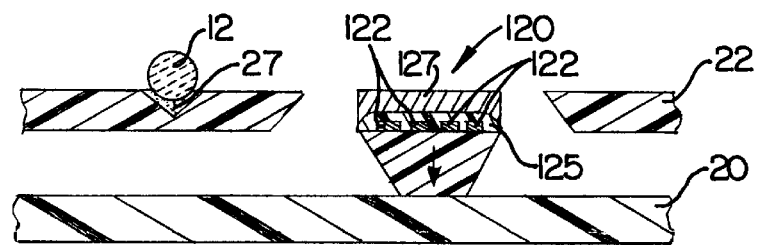
FIG. 6B is a fragmentary cross-sectional view of the microactuator of FIG. 6A which illustrates the downward deflection of an elongate actuator portion which serves to lift the carrier and, in turn, the optical fiber mounted upon the carrier.

In order to move the carrier 22 upward relative to the alignment support structure 20, i.e., in the y-direction, the microactuator 10 of FIG. 6A can include another bimorphic actuator 28 having a pair of elongate actuator portions 120. According to one embodiment shown in cross-section in FIG. 6B, each actuator portion is generally rectangular and is separated from the carrier body 24 along three sides so as to extend in a cantilevered fashion. As also shown in FIG. 6B, each actuator portion includes a thin film heater 122 which traces a circuitous path thereupon. The thin film heater also includes bonding pads 124 at the opposed ends thereof such that electrical current can be passed through the thin film heater. Each actuator portion can also include an insulating layer 125, typically formed of silicon dioxide, covering the circuitous thin film heater. In addition, each actuator portion can include a metallic layer 127, typically formed of nickel or copper, covering the insulating layer. By radiatively heating the metallic layer, such as by passing current through the thin film heater as described above, the respective actuator portion can be deflected downwardly and urged against the alignment support structure 20 as shown in FIG. 6B in order to lift the carrier 22 and, in turn, the optical fiber 12 upwardly.

While the embodiments of the microactuator 10 described hereinabove include three actuators 28 of the same type which are adapted to deflect in three orthogonal directions, the microactuator can include more than one type of actuator without departing from the spirit and scope of the present invention. As shown in FIGS. 7–14, for example, the carrier body 24 defines a reference plane. In contrast to the previously described embodiments, however, the microactuator includes one type of actuator for moving the carrier 22 and, in turn, the optical fiber 12 in a direction orthogonal to the reference plane defined by the carrier body, i.e., in the y-direction, and another type of actuator for moving the carrier within the reference plane defined by the carrier body, i.e., in the x- and z-directions.

For example, the microactuator 10 of FIG. 14 includes a first type of actuator 28, such as an asymmetric monomorph 128, for moving the carrier 22 within the reference plane defined by the carrier body 24, i.e., in the x- and z-directions. However, the microactuator of FIG. 14 includes another type of actuator, such as a diaphragm 132 or a comb structure 144 as described below, to move the carrier and, in turn, the optical fiber 12 in a direction orthogonal to the reference plane defined by the carrier body, i.e., in the y-direction.

In particular, the microactuator 10 of FIG. 14 includes at least one and, more preferably, a pair of asymmetric monomorphs 128 for moving the carrier 22 within the reference plane defined by the carrier body, i.e., in the x- and z-directions. However, the microactuator of FIG. 14 also includes another type of actuator, such as a diaphragm 132 or a comb structure 144 as described below, to move the carrier 22 and, in turn, the optical fiber 12 in a direction orthogonal to the reference plane defined by the carrier body, i.e., in the y-direction.

Each asymmetric monomorph 128 includes first and second portions 128a, 128b which form opposite legs of the U-shaped structure. As shown in FIG. 14, the first and second portions are interconnected at one end and are connected to respective bonding pads 130 at the other end.

The asymmetric monomorph 128 is typically formed of a conductive material, such as nickel. However, the first and second portions 128a, 128b define the first and second resistances, respectively, which are unequal. In particular, the first and second portions of the asymmetric monomorph have different cross-sectional areas which at least partially define the respective resistances. As shown in FIG. 14, for example, the second portion of the asymmetric monomorph can have a much greater cross-sectional area than the first portion such that the resistance per unit area of the second portion is less than the resistance per unit area of the first portion.

By passing a current through the asymmetric monomorph 128, the first and second portions 128a, 128b undergo different amounts of joule heating due to the different resistances of the first and second portions. In the embodiment of FIG. 14, for example, the smaller first portion will be heated more than the larger second portion. As a result, the first and second portions will expand in different manners and the asymmetric monomorph will deflect in a predetermined direction. In the embodiment illustrated in FIG. 14, for example, the asymmetric monomorph will deflect toward the larger second portion since the smaller first portion will be heated more and will expand to a greater degree than the second portion. Since the asymmetric monomorph is preferably disposed such that the larger second portion is closer to the alignment support structure 20 than the smaller first portion, the asymmetric monomorph will deflect in a direction toward the alignment support structure, i.e., outwardly. As a result, the asymmetric monomorph will be operably urged against the alignment support structure so as to move the carrier 22 in a direction opposite the predetermined direction which the asymmetric monomorph is deflected. The carrier can therefore be controllably located relative to the alignment support structure and the optical fiber 12 can be precisely positioned, such as in alignment with an optical device 14.

With respect to the embodiment shown in FIGS. 7–10, the microactuator 10 includes first and second bimorphic actuators 28 (each of which includes first and second elongate actuator portions 120) for moving the carrier 22 in the x- and z-directions within the reference plane defined by the carrier body 24. However, the microactuator of this embodiment also includes a diaphragm 132 which deflects or bows outwardly in the z-direction in response to a predetermined stimuli so as to move the carrier in a direction orthogonal to the reference plane defined by the carrier body.

In one embodiment, the diaphragm 132 can be formed of a piezoelectric material which is prebuckled so as to deflect in the predetermined direction in response to the application of a voltage thereacross. Alternatively, the diaphragm can be formed of an SMA material, such as an alloy of titanium and nickel or an alloy of titanium, nickel and copper, which is trained to deflect in the predetermined direction in response to thermal stimulation, such as by radiatively heating the SMA material with the thin film heaters 122 shown in FIGS. 7 and 9.

The alignment support structure 20 or the carrier 22 can include the diaphragm 132 without departing from the spirit and scope of the present invention. In the embodiment illustrated in FIGS. 7–10, however, the carrier includes the diaphragm which is adapted to deflect outwardly or downwardly toward the alignment support structure in response to the predetermined stimuli in order to lift the carrier upwardly relative to the alignment support structure.

According to one embodiment shown in FIGS. 7 and 8, the carrier body 24 defines an aperture 134, such as a rectangular aperture, near the groove 26 which holds the optical fiber 12. Although the aperture can be formed in a variety of manners without departing from the spirit and scope of the present invention, the aperture of one embodiment is etched through the carrier body with potassium hydroxide (KOH). The diaphragm 132 is attached to the lower surface 136 of the carrier body which faces the alignment support structure 20 such that the diaphragm covers the aperture. For example, the diaphragm is typically attached to the lower surface of the carrier body with a two-part epoxy or by anodically bonding.

In order to establish electrical contact with the diaphragm 132, the diaphragm of one advantageous embodiment is sandwiched between a pair of thin electrodes. The pair of electrodes can include a positive electrode 133 disposed on an interior surface of the diaphragm between the diaphragm and the carrier body 24. The pair of electrodes can also include a negative electrode 135 disposed on an exterior surface of the diaphragm, opposite the interior surface. In one advantageous embodiment, the positive electrode is formed of silicon nitride with a platinum metallization, while the negative electrode is formed of platinum. As will be apparent to those skilled in the art, electrical contact can be made with the positive and negative electrodes by means of respective thin film conductors formed on the lower surface of the carrier body 24, such as by vapor deposition. The thin film conductors preferably extend from respective ones of the electrodes to edge portions of the carrier body and, in some embodiments, to respective bonding pads along the edge portion of the carrier body. For a diaphragm formed of a piezoelectric material, the diaphragm can be deflected by applying a voltage differential between the electrodes and across the diaphragm. Alternatively, for a diaphragm formed of an SMA material, the diaphragm can be deflected by passing current through the diaphragm. As described above and as shown in cross-section in FIG. 8, the diaphragm is preferably formed or trained such that stimulation of the diaphragm will cause the diaphragm to a deflect or bow downwardly toward the alignment support structure 20 to thereby lift the carrier body and, in turn, the optical fiber 12 upwardly.

In an alternative embodiment shown in FIGS. 9 and 10, the diaphragm 132 is mounted to a separate wafer 138 which is bonded or otherwise adhered to the lower surface 136 of the carrier body 24 to thereby form the carrier 22. As shown in FIGS. 9 and 10, the wafer defines an aperture 140, such as a rectangular aperture. For example, the wafer may be formed of silicon which is etched, such as with KOH, to form the rectangular aperture. As described above, the diaphragm is mounted to a lower surface 142 of the wafer so as to cover the aperture. In addition, a pair of electrodes 133, 135 can be disposed on opposite surfaces of the diaphragm as described above in conjunction with the embodiment of FIGS. 7 and 8 in order controllably actuate the diaphragm. Electrical contact can be established with the opposed electrodes via respective thin film conductors formed on the lower surface of the wafer, such as by vapor deposition, so as to extend from respective ones of the electrodes to edge portions of the wafer and, in some embodiments, to respective bonding pads disposed along the edge portions of the carrier body. As shown in cross section in FIG. 10, the wafer is bonded to the lower surface of the carrier body, such as with a two-part epoxy or by anodically bonding, such that subsequent stimulation of the diaphragm via the thin film conductors will cause the diaphragm to deflect or bow outwardly or downwardly toward the alignment support structure 20, thereby lifting the carrier body and, in turn, the optical fiber 12 upwardly.

In yet another embodiment, the actuator 28 which moves the carrier 22 and, in turn, the optical fiber 12 in a direction orthogonal to the reference plane defined by the carrier body 24, i.e., the y-direction, can include a comb structure 144. As described above in conjunction with the diaphragm 132, the comb structure can be formed either on the lower surface 136 of the carrier body or on the lower surface 142 of a separate wafer 138 which is then bonded to the lower surface of the carrier body as shown in FIGS. 11 and 12. As described hereinbelow, the comb structure also deflects in a predetermined direction, such as in a downward direction toward the alignment support structure 20, in response to thermal stimuli.

As shown in FIG. 11, the comb structure 144 includes a plurality of bimorphic members 146. Each bimorphic member includes first and second layers 146a, 146b formed of first and second materials, respectively. The first and second materials are preferably selected to have first and second coefficients of thermal expansion, respectively. For example, the first material can be silicon while the second material is a metal, such as nickel or copper, having a larger coefficient of thermal expansion than the first material. The metallic second layer can be deposited on the first layer by a variety of methods, including preferential sputtering, directed evaporation, electroplating and electroforming, such as a LIGA process, without departing from the spirit and scope of the present invention. Alternatively, the second layer can be formed of an SMA material which is sputtered upon the first layer as described above.

Each bimorphic member 146 includes an elongate central portion 148 which extends between opposed end portions 150. The opposed end portions of each bimorphic member are attached to the carrier body 24 or to the wafer 138. However, a relief groove 152 is preferably formed under the central portion of each bimorphic member such that the central portion is independent of the carrier body or the wafer.

As described above in conjunction with bimorphic actuators, the bimorphic members 146 are formed so as to deflect in the same predetermined direction, i.e., downwardly toward the alignment support structure 20 in the embodiment of FIGS. 11 and 12, in response to thermal stimuli so as to controllably position the carrier 22 relative to the alignment support structure. Accordingly, the comb structure 144 of this embodiment also preferably includes means for heating the bimorphic members to thereby cause the bimorphic members to deflect in the predetermined direction. In the illustrated embodiment in which the bimorphic members are spaced apart and extend in a parallel relationship, the heating means preferably extends between adjacent ones of the bimorphic members so as to heat the bimorphic members in a relatively even manner. For example, the heating means can include a circuitous thin film heater 122, such as a polysilicon heater, which extends between adjacent ones of the bimorphic members. The opposed ends of the thin film heater preferably extend to the edge portions of the carrier body such that electrical contact can be readily established with the thin film heater. By passing a current through the thin film heater, the bimorphic members are radiatively heated. For bimorphic elements formed of first and second layers 146a, 146b which have different coefficients of thermal expansion, the bimorphic elements will deflect or bow downwardly toward the alignment support structure. Likewise, for bimorphic elements having a second layer formed of an SMA material, the bimorphic elements will deflect or bow downwardly toward the alignment support structure.

Each bimorphic member 146 can include a protuberance 156 which extends outwardly from a central portion 148 of the respective bimorphic member. In particular, each protuberance extends outwardly in the predetermined direction in which the bimorphic member is deflected. In addition, each protuberance is located upon the bimorphic member such that the protuberance, and not the remainder of the bimorphic member, contacts the alignment support structure 20 upon deflection of the bimorphic member. As a result, the protuberance serves as a thermal choke to effectively isolate the remainder of the bimorphic member from the alignment support structure such that the generally cooler temperature of the alignment support structure does not disadvantageously cool the bimorphic member which could, in turn, decrease the amount of deflection of the bimorphic member. The protuberance can be a separate element which is attached to the respective bimorphic member. Alternatively, the protuberance can be integrally formed with the bimorphic member.

While the comb structure 144 or the diaphragm 132 can be disposed upon the lower surface 136 of the carrier body 24 or upon the lower surface 142 of a separate wafer 138 which is thereafter bonded to the lower surface of the carrier body to form the carrier 22, the comb structure or the diaphragm can, instead, be disposed upon and can form part of the alignment support structure 20. As shown in FIG. 13, for example, the comb structure can be disposed upon an upper surface of the alignment support structure such that thermal stimulation of the bimorphic members 146 causes the bimorphic members to deflect in an upward direction toward the carrier so as to lift the carrier and, in turn, the optical fiber 12 upwardly. In this regard, while the alignment support structure is shown to include a comb structure, the alignment support structure can include other types of actuators, as described herein in conjunction with the carrier, in order to controllably position the carrier and, in turn, the optical fiber without departing from the spirit and scope of the present invention.

Regardless of the type of actuation, the microactuator 10 of the present invention can precisely position an optical fiber 12, such as in alignment with an optical device 14, by controllably varying the deflection of the respective actuators 28. As the respective actuators are deflected, the efficiency with which the optical signals produced by the optical device are coupled to and transmitted via the optical fiber can be detected. Once the position in which the optical signals are most efficiently transmitted via the optical fiber is detected, such as by detecting the maximum output power, the optical fiber can be held in position by the actuators while the relative positions of the carrier 22 and the alignment support structure 20 are fixed, such as by bonding the carrier to the alignment support structure.

In one embodiment, the alignment support structure 20 includes means for securing the carrier 22 thereto once the optical fiber 12 is aligned with the optical device 14. As shown in FIGS. 1 and 2, the securing means can include at least one outwardly extending post 40 which is preferably formed by a LIGA process or by reactive ion etching. In addition, the carrier of this embodiment preferably defines at least one aperture 42 adapted to receive a respective post therein. The apertures defined by the carrier are preferably anisotropically wet-etched or laser cut therein and, in one embodiment, are frustoconical in shape so as to facilitate movement between the carrier and the post of the alignment support structure.

As illustrated, the groove 26 and the apertures 42 are preferably anisotropically etched in the carrier 22 in two different directions or orientations, such as <110> and <100>. In order to provide such different types of etching, the carrier can be comprised of at least two different wafers, such as silicon wafers, having different orientations, such as <110> and <100> in the above example. In addition, the carrier can be coated with a material having a relatively low coefficient, such as a TEFLON® coating, in order to reduce the frictional forces between the carrier and the alignment support structure 20.

The securing means of the alignment support structure 20 can also include an adhesive 39 adapted to bond the outwardly extending posts 40 of the alignment support structure to the carrier 22 once the optical fiber 12 is precisely aligned with the optical device 14. For example, a bonding agent, such as gold/tin eutectic alloy solder, a Gould GlasSolder™ bonding agent or glass frit, can be disposed on the interior surface of the aperture defined by the carrier. Once the optical fiber is precisely aligned with the optical device, the adhesive can be activated, such as by laser heating or resistive heating, to bond the carrier to the alignment support structure. Once the alignment support structure and the carrier are bonded, the alignment of the optical fiber with the optical device is maintained irrespective of further electrical stimulation of the actuators 28.

The microactuator 10 and, more preferably, the alignment support structure 20 can define a reference location 44 with which a predetermined portion of the carrier 22, such as a predetermined corner 22a, is preferably initially positioned. Thereafter, the position of the carrier can be adjusted relative to the alignment support structure such that the optical fiber 12 is precisely aligned with the optical device 14.

Furthermore, the carrier 22 can be initially positioned relative to the alignment support structure 20 such that the optical fiber 12 is slightly misaligned, such as by 5–10 micrometers, relative to the optical device in a predetermined direction. The predetermined direction is preferably selected based upon the relative movement provided by the actuators 28 such that the actuators can compensate for the slight misalignment and can align the optical fiber with the optical device. In other words, the actuators of the microactuator 10 are generally designed to move the carrier, and, in turn, the optical fiber in a predetermined direction, typically one predetermined direction, relative to the alignment support structure as illustrated by arrows 36 in FIG. 5. Therefore, the carrier is preferably initially positioned so as to be slightly misaligned in a direction opposite that indicated by arrows 36 such that movement of the carrier in the predetermined direction by the actuators compensates for the slight misalignment and, in fact, brings the optical fiber into alignment with the optical device.

In one embodiment, the alignment support structure 20 also includes bias means for urging the predetermined portion of the carrier 22 towards the reference location 44 defined by the alignment support structure. In the illustrated embodiment, the bias means includes a plurality of springs 46 for contacting the carrier, such as a sidewall 38 of the carrier, and for urging the predetermined portion of the carrier toward the reference location. In particular, the alignment support structure of the illustrated embodiment includes first and second springs for urging the carrier in first and second orthogonal directions, respectively, toward the reference location.

As illustrated in FIGS. 1 and 5, the first and second springs 46 preferably urge the carrier 22 in first and second directions, respectively, which are substantially opposite to the first and second directions in which the first and second actuators 28, i.e., the x- and z- actuators, urge the carrier. The bias force provided by the springs is preferably less than the force provided by the actuators upon deflection, however, such that deflection of the actuators overcomes the bias force of the springs and frictional forces between the carrier and the alignment support structure 20 so as to move the predetermined portion of the carrier away from the reference location 44.

The springs 46 can also be formed during a LIGA process or by reactive ion etching so as to have relatively large height-to-width ratios. In addition, the springs can include a curved or hook member 48 to facilitate opening or spreading of the springs upon mounting of the carrier 22 to the alignment support structure 20. In particular, a microprobe can engage a respective hook member so as to open or spread the spring during mounting of the carrier.

Figure 15:
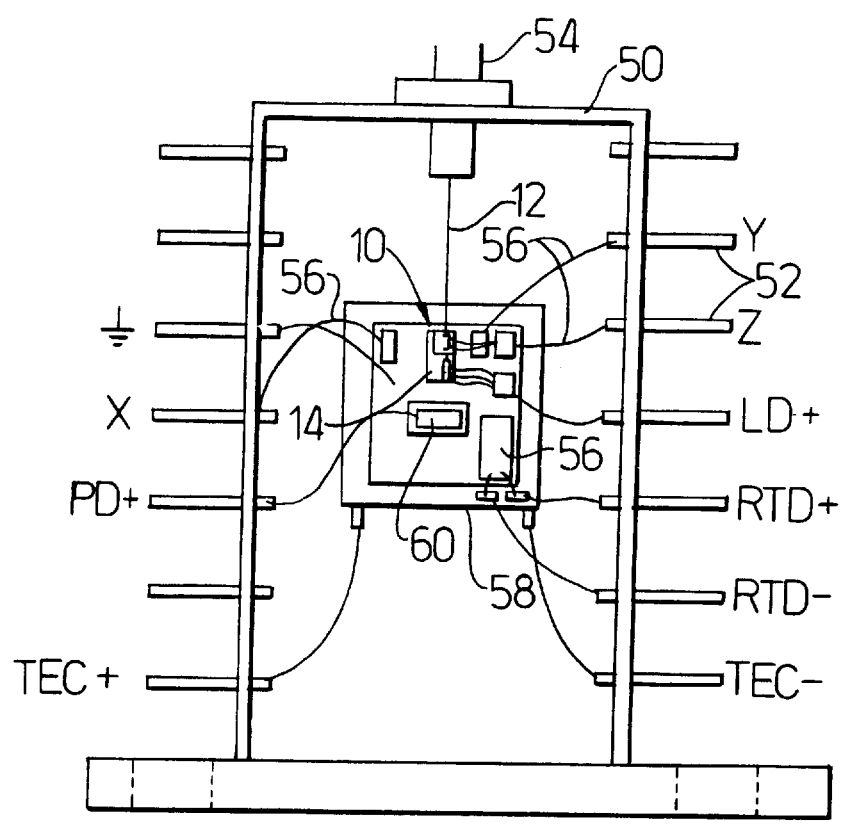
FIG. 15 is a schematic representation of the microactuator of one embodiment of the present invention disposed within a hermetically sealed package for aligning an optical fiber with an optical device which is also disposed within a hermetically sealed package.

In one exemplary embodiment illustrated schematically in FIG. 15, the microactuator 10 of the present invention can controllably align an optical fiber 12 with an optical device 14, such as a laser diode, within a relatively small, hermetically sealed package, such as a hermetically sealed butterfly package. According to the present invention, the microactuator can align the optical fiber with the optical device prior to or following the hermetic sealing of the package. If the optical fibers are aligned prior to hermetically sealing the package, the package can thereafter be potted, such as with a plastic material, or a lid may be affixed to the package, such as by laser welding or seam sealing, such that the package housing the aligned optical fibers is hermetically sealed.

As known to those skilled in the art, the hermetically sealed package typically includes a relatively small, hermetic canister 50, such as a gold-plated KOVAR™ canister having a plurality of KOVAR™ feed-through pins 52 which are glass-to-metal hermetically sealed to the canister. An optical device 14 and a microactuator 10 having an optical fiber 12 mounted thereto are also disposed within the hermetic canister. In order to effectively seal the hermetic canister, the optical fiber is preferably metallized and soldered to the fiber optic sealing tube 54 of the hermetic canister. As also known to those skilled in the art, the hermetically sealed package can also include means for controlling the temperature of the optical device including a thermistor 56 and a thermal electric cooler 58. Furthermore, the hermetically sealed package can include a photodetector 60 for detecting the output of the optical device such that the excitation energy supplied to the optical device and the resulting output of the optical device can be controlled as desired, such as controlling the excitation energy supplied to the optical device such that a constant output is provided by the optical device.

The optical fiber 12 is preferably aligned with the optical device 14 with the microactuator 10 within the hermetic canister 50 as described above. In particular, the actuators 28 of the microactuator, as well as the other electrical components disposed within the hermetic canister, are stimulated, such as by leads 56 extending from respective pins 52 of the hermetically sealed package as illustrated in FIG. 15. Thus, by controllably adjusting the respective deflections provided by the actuators, the alignment of the optical fiber to the optical device can be controlled. In particular, the first, second and third actuators can be controllably adjusted in three orthogonal directions by providing appropriate electrical stimulation via the leads identified as X, Y and Z in FIG. 15. Furthermore, by detecting the efficiency with which the optical signals produced by the optical device are coupled to the optical fiber, the optical fiber can be precisely aligned with the optical device.

Thereafter, the relative positions of the optical fiber 12 and the optical device 14 can be fixed by bonding the carrier 22 to the alignment support structure 20, such as by heating the adhesive disposed within the respective apertures 42 defined by the carrier. For example, the hermetic canister 50 can include a transparent window through which a laser can be directed so as to heat the adhesive and bond the carrier to the alignment support structure. Alternatively, the hermetically sealed package can include an additional lead which is electrically connected to the alignment support structure in the vicinity of the adhesive such that the adhesive can be resistively heated and the carrier can thereby be bonded to the alignment support structure.

Accordingly, an optical fiber 12 can be precisely aligned with an optical device 14, such as a laser diode, within a hermetically sealed package. Once the optical fiber is precisely aligned, the respective positions of the optical fiber and the optical device can be fixed such that the precise alignment is maintained. The microactuator can thereafter remain within the hermetically sealed package following the alignment of the optical fiber with the optical device, thereby further insuring that the optical fiber maintains alignment with the optical device. For example, in embodiments in which the carrier 22 is not bonded to the alignment support structure 20 following the alignment of the optical fiber with the optical device, the microactuator can subsequently reposition or realign the optical fiber with the optical device to compensate for variations in the optical alignment which occur during use.

In addition to a hermetically sealed package which includes an optical device 14, such as a laser diode, one or more microactuators 98 can be disposed within a fiber optic connector 70. As described below, the microactuators can precisely align optical fibers 83 with respective lens elements 86 of the fiber optic connector in order to collimate the optical signals transmitted therethrough.

By way of example, the alignment apparatus of this embodiment is a fiber optic connector 70 as illustrated in FIG. 16. The fiber optic connector generally includes a connector housing 72. While the connector housing can be comprised of a variety of materials, the connector housing of one embodiment is comprised of a metal, such as stainless steel, and, in a more specific embodiment, is comprised of KOVAR™ brand stainless steel. As known to those skilled in the art, a KOVAR™ connector housing is comprised of a type of stainless steel which has a coefficient of thermal expansion which matches the coefficient of an optical fiber and thermal expansion of a glass lens element, an optical fiber and the glass of the glass-to-metal seals or bonds, such as between the lens elements and the front plate 74 of the fiber optic connector, as known to those skilled in the art.

As illustrated in FIG. 16, the connector housing 72 can include a face plate 74 defining a plurality of apertures 76 therethrough. The face plate is mounted to the cup-shaped body portion 78 of the connector housing as shown in FIG. 16 to thereby define an internal cavity within the connector housing. According to one embodiment, the face plate can be laser welded or seam sealed to the body portion such that the connector housing is hermetically sealed. In addition, the exterior surface of the front plate can be polished so as to form a relatively planar surface, including the lens elements and the front plate, such that the front plate is more readily cleanable and can be coated, such as with an anti-reflection coating. By polishing the front plate, spurious deflections from surface defects on the front plate can also be minimized. In addition, the front plate can be polished at a predetermined angle, such as 3° to 5°, to prevent light reflections from the respective front plates of a pair of mated fiber optic connectors, thereby minimizing reflected feedback.

As illustrated in FIG. 17, the rear surface of the connector housing 72 can include a slot 81 through which one or more optical fibers 83 extend. For example, a fiber optic cable 84, such as a fiber optic ribbon cable, comprised of a plurality of individual optical fibers can extend through the slot defined in the rear surface of the connector housing. As described in detail below, each of the optical fibers is preferably individually aligned with a respective aperture 76 defined in the front plate 74 of the connector housing.

In order to more efficiently couple the optical signals transmitted by the optical fibers 83, the fiber optic connector 70 of the present invention can include one or more lens elements 86. Preferably, a lens element is disposed within each of the apertures 76 defined in the front plate 74 of the connector housing 72 for collimating the optical signals transmitted by the respective optical fibers. At least a portion of each lens element is preferably metallized, such as with titanium, platinum and gold, such that the lens elements can be affixed, such as by soldering, within the respective apertures defined in the front plate of the connector housing. In one advantageous embodiment, an end portion 86a of each lens element is polished, coated with an anti-reflection coating and aligned with the polished exterior surface of the front plate of the connector housing as illustrated in FIG. 16. The lens elements can also include cylindrical graded index lens elements to further enhance the collimation of the optical signals.

Accordingly, the fiber optic connector 70 of the present invention can precisely align a plurality of optical fibers 83 with respective ones of a plurality of lens elements 86 disposed within the respective apertures 76 defined in the front plate 74 of the connector housing 72. As illustrated in FIG. 18, the fiber optic connector can then be mated with a second fiber optic connector, such that the optical signals transmitted via the optical fibers of the first fiber optic connector can be efficiently coupled to the optical fibers of the second fiber optic connector.

In order to mate the first and second fiber optic connectors 70 such that the respective optical fibers 83 are maintained in an aligned relationship, one of the fiber optic connectors can include a plurality of alignment pins 88 extending outwardly from the front plate 74 as shown in FIG. 16. The front plate of the other fiber optic connector can define a plurality of corresponding apertures adapted to receive respective ones of the alignment pins. Once the fiber optic connectors have been aligned, the fiber optic connectors can be secured in the aligned relationship, such as by extending a connector 90 through corresponding apertures 92 defined in the laterally extending tabs 94 of the respective front plates of the fiber optic connectors as shown in FIG. 18.

Figure 19:
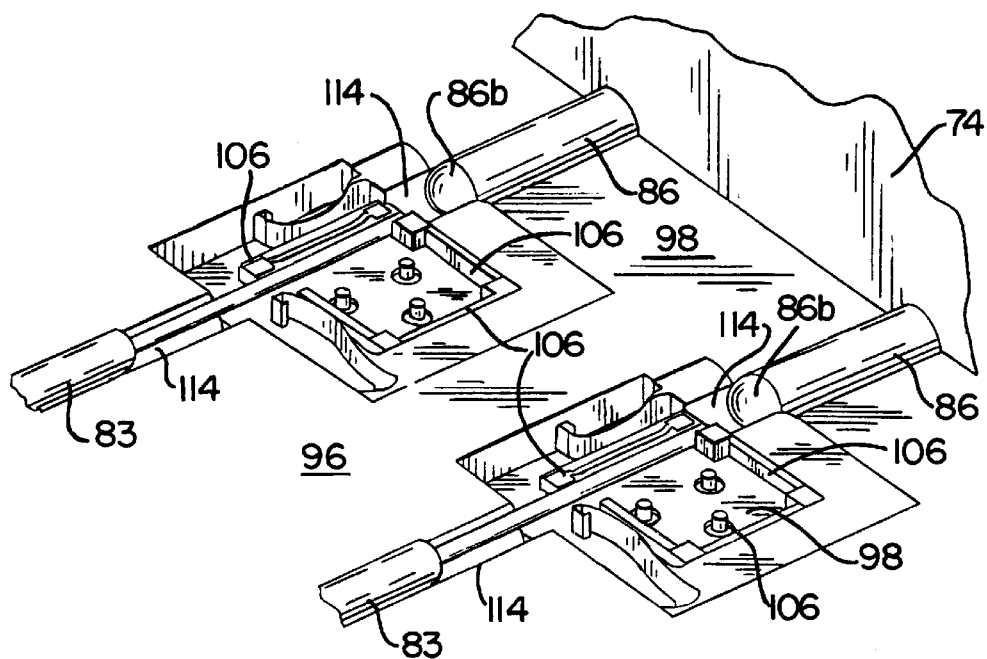
FIG. 19 is a fragmentary perspective view of a portion of the fiber optic connector of one embodiment of the present invention illustrating the substrate and a pair of microactuators mounted therein for aligning a pair of optical fibers with respective lens elements.

As shown in FIG. 19, the fiber optic connector 70 of the present invention preferably includes an alignment support structure or a substrate 66, such as a metallic, a ceramic or a silicon substrate, and at least one microactuator 98 mounted on the substrate and adapted from relative movement therewith. An optical fiber 83 is preferably affixed to each microactuator such that the relative movement of the microactuator will controllably position the respective optical fiber with respect to an aperture 76 defined in the front plate 74 of the connector housing 72 and, in one advantageous embodiment, with respect to a lens element 86 disposed within the aperture. As shown in FIG. 19, the fiber optic connector of one advantageous embodiment includes a plurality of microactuators, one of which is associated with each optical fiber so as to align the respective optical fiber with a corresponding lens element 86.

Each microactuator 98 of the fiber optic connector 70 of this embodiment operates in a similar manner to that described above. In particular, each microactuator includes positioning means, such as one or more actuators 106, for controllably positioning the carrier 100 relative to the substrate 96. As shown in FIG. 19, for example, the substrate can define a plurality of recessed portions in which the respective microactuators are disposed. Thus, the actuators of the microactuators are preferably urged against the surrounding sidewalls of the substrate upon electrical stimulation of the bimorphic actuator such that the optical fibers carried by the microactuators can be controllably positioned relative to a respective lens element 86.

The microactuator 98 of this embodiment of the present invention can thereby align an optical fiber 83 with a respective lens element 86 by controllably varying the deflection of the respective actuators 106. As the respective actuators are deflected, the efficiency with which the optical signals produced by the optical device are coupled to and transmitted via the optical fiber can be detected. Once the position in which the optical signals are most efficiently transmitted via the optical fiber is detected, such as by detecting the maximum output power, the optical fiber can be held in position by the actuators while the relative positions of the optical fibers and the lens elements are fixed.

Figure 20:
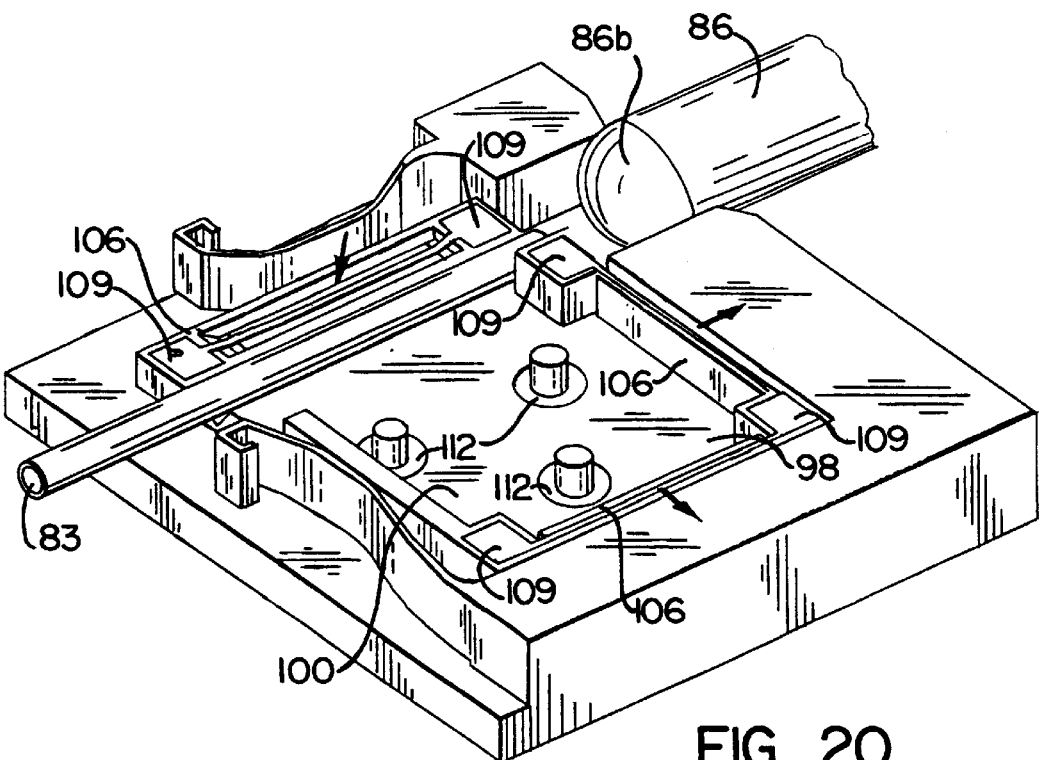
FIG. 20 is a greatly enlarged perspective view of a microactuator of one embodiment of the fiber optic connector of the present invention.

As illustrated in FIG. 19, the substrate 96 can also include one or more sets of first and second grooves 114. The first and second grooves are sized and shaped for receiving an optical fiber 83 and a lens element 86, respectively. As shown in FIGS. 19 and 20, the lens element can include a hemispherically ground surface on a first end 86b and a polished second end 86a to further facilitate the collimation and transmission of optical signals so as to reduce, among other things, spurious reflections. In addition, both end surfaces of the lens element, as well as the end surface of the optical fiber, can be coated with an anti-reflectance coating to further enhance optical transmission.

As shown, each optical fiber 83 received by the fiber optic connector 70 is preferably disposed within a respective groove 114 defined in the substrate 96. A microactuator 98 and a lens element 86 are also associated with each optical fiber such that the microactuator can controllably position the respective optical fiber with the lens element. In addition to being positioned in a predetermined position, such as within an aperture 76 defined by the front plate 74 of the connector housing 72, the lens elements collimate the optical signals.

According to the present invention, a plurality of microactuators 98 can be mounted on a substrate 96 within the internal cavity of the connector housing 72. An optical fiber 83 is also preferably bonded to the carrier 100 of each microactuator such that the microactuators can controllably position the optical fibers with respect to respective lens elements 86 disposed within apertures 76 defined in the front plate 74 of the connector housing 72. Since the microactuators and the optical fibers mounted thereon need not be physically contacted during the alignment process, the optical fibers can be aligned either prior to or following the hermetic sealing of the connector housing, such as by affixing the front plate thereto.

In embodiments in which the optical fibers 83 are aligned prior to sealing the connector housing 72, the optical fibers can be aligned with respect to respective lens elements. Thereafter, the connector housing can be sealed. For example, a lid can be secured, such as by seam sealing, to the connector housing following alignment of the optical fibers. In addition, the relative positions of the optical fibers can be fixed prior to sealing the connector housing, such as by activating an adhesive between the carrier 100 and the substrate 96 as described below, thereby bonding the carrier to the substrate.

Alternatively, in embodiments in which the optical fibers 83 are aligned after hermetically sealing the connector housing 72 and as illustrated in FIG. 2, the fiber optic connector 70 can also include a plurality of electrical pins 116 which can, in one embodiment, extend through the rear surface 82 of the connector housing to provide electrical access to the bimorphic actuators 106 of the plurality of microactuators 98. In particular, electrical leads preferably interconnect the pins with respective ones of the actuators. With respect to the embodiment illustrated in FIG. 15, for example, electrical leads preferably interconnect the pins with respective ones of the bonding pads disposed on the opposed end portions 109 of each bimorphic actuator. Accordingly, by applying appropriate electrical stimuli to predetermined ones of the electrical pins, each optical fiber can be individually positioned in first, second and third orthogonal directions relative to the respective lens element 86 after the connector housing has been hermetically sealed.

By transmitting predetermined optical signals through the optical fibers 83 and by detecting the resulting optical signals transmitted by the respective lens elements 86, the relative alignment of the optical fiber with a respective lens element can be determined. In particular, the position of the optical fiber at which the maximum output power is detected can be determined. In order to obtain the maximum output power, the end surface of the optical fiber is preferably aligned at the focal point of the respective lens element.

Thereafter, the relative positions of the optical fiber 83 and the lens element 86 can be fixed by bonding the carrier 100 to the substrate 96, as described above, such as by heating the adhesive disposed within the respective apertures 112 defined by the carrier such that the position of the carrier relative to the substrate which provides the maximum output power remains fixed.

Figure 21:
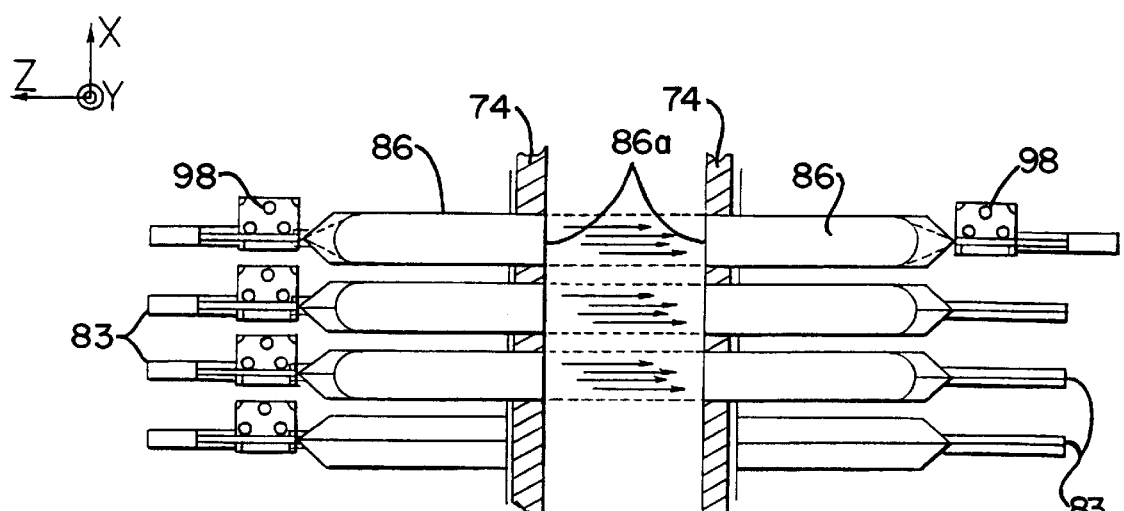
FIG. 21 is a schematic plan view illustrating the transmission of optical signals between the optical fibers of a pair of fiber optic connectors according to one embodiment of the present invention in which only a portion of the respective fiber optic connectors is illustrated for the sake of clarity.

As schematically illustrated in FIG. 21, the lens elements 86 preferably collimate the optical signals such that the signals can be efficiently coupled between a pair of aligned optical fibers 83. Accordingly, optical signals which are transmitted via a plurality of first optical fibers, such as a plurality of single mode optical fibers, and can be efficiently coupled to respective ones of a plurality of second optical fibers due to the precise alignment provided by the fiber optic connector 70 of the present invention. Although not illustrated, the fiber optic connector can align and interconnect the plurality of first optical fibers with a variety of other optical devices, such as a laser diode array or an array of optical waveguides.

In the embodiment of the present invention in which the optical fibers 83 are controllably positioned relative to lens elements 86 following the hermetic sealing of the connector housing 72, the alignment of the optical fibers is further enhanced since the optical fibers are not physically contacted or otherwise heated during the alignment process. In addition, by hermetically sealing the connector housing, the optical fibers are protected from various environmental contaminants, such as moisture and dirt.

Therefore, the microactuator 10, 98 of the various embodiments of the present invention precisely positions an optical fiber 12, 83, such as a single mode optical fiber. For example, the microactuator can precisely align an optical fiber with an optical device 14, 86, such as a laser diode, due to the controlled deflection of the actuators 28, 106 of the microactuator. For example, one or more microactuators can be disposed within a fiber optic connector 70 as to align optical fibers with respective lens elements such that the optical signals transmitted by the optical fibers can be efficiently coupled to another optical device, such as another optical fiber. In addition, during the process of aligning and bonding an optical fiber, the microactuator of the present invention does not heat or otherwise perturb adjacent microactuators or the optical fibers maintained therein such that a plurality of adjacent optical fibers can be precisely aligned.

Since the microactuator 10, 98 does not require physical contact with the optical fiber 12, 83, the microactuator of the present invention can precisely align an optical fiber to an optical device, such as a laser diode 14 or a lens element 86, within a relatively small, hermetically sealed package, such as a butterfly package or a connector housing 70, without requiring a relatively large alignment system external to the optical package. In addition, the microactuator of the present invention can be readily fabricated in an economical manner such that the microactuator can remain within a hermetically sealed package following the initial alignment of the optical fiber with the optical device so as to maintain alignment or to provide subsequent realignment of the optical fiber. Alternatively, the microactuator can permanently bond an optical fiber in an aligned relationship with the optical device.

In the drawings and the specification, there has been set forth preferred embodiments of the invention and, although specific terms are employed, the terms are used in a generic and descriptive sense only and not for the purpose of limitation, the scope of the invention being set forth in the following claims.

That which is claimed is:

1. A microactuator for precisely positioning an optical fiber, the microactuator comprising:
   an alignment support structure; and
   a carrier, movably mounted to said alignment support structure, for holding the optical fiber in a fixed relation thereto, said carrier including at least one actuator which deflects in a predetermined direction in response to a predetermined stimulus such that said actuator is operably urged against a portion of said alignment support structure such that further deflection of said at least one actuator in the predetermined direction moves said carrier in a direction opposite the predetermined direction in which said actuator is deflected such that said carrier is controllably located relative to said alignment support structure and the optical fiber is precisely positioned.

2. A microactuator according to claim 1 wherein said actuator comprises a diaphragm which deflects in the predetermined direction in response to the predetermined stimulus.

3. A microactuator according to claim 2 wherein said diaphragm is comprised of a material selected from the group consisting of piezoelectric material and shape memory alloy material.

4. A microactuator according to claim 1 wherein said actuator is a bimorphic actuator comprised of first and second layers comprising first and second materials, respectively, and having first and second coefficients of thermal expansion, respectively, such that the first and second materials differentially expand in response to the predetermined stimulus to thereby deflect said bimorphic actuator.

5. A microactuator according to claim 4 further comprising a thin film heater disposed upon said carrier for thermally stimulating said bimorphic actuator.

6. A microactuator according to claim 1 wherein said actuator is comprised of a plurality of material layers, and wherein at least one of the material layers is comprised of a piezoelectric material which deflects in response to electrical stimuli.

7. A microactuator according to claim 6 wherein said actuator is comprised of a plurality of material layers, and wherein at least one of the material layers is comprised of a shape memory alloy material which deflects in response to thermal stimuli.

8. A microactuator according to claim 7 further comprising a thin film heater disposed upon said carrier for thermally stimulating said actuator.

9. A microactuator according to claim 1 wherein said actuator comprises first and second elongate actuator portions extending from respective end portions which are affixed to said carrier, and wherein both said first and second actuator portions deflect in the same predetermined direction in response to the predetermined stimulus.

10. A microactuator according to claim 1 wherein said actuator comprises an elongate central portion extending between opposed end portions, the opposed end portions being affixed to said carrier such that the elongate central portion bends in the predetermined direction in response to the predetermined stimulus.

11. A microactuator according to claim 1 wherein said carrier comprises first and second actuators which deflect in first and second orthogonal directions, respectively, in response to the predetermined stimulus to thereby controllably position said carrier in the first and second orthogonal directions relative to said alignment support structure.

12. A microactuator according to claim 11 wherein said carrier further comprises a third actuator which deflects in a third direction, orthogonal to the first and second directions, in response to the predetermined stimulus to thereby controllably position said carrier in the third direction relative to said alignment support structure.

13. A microactuator for precisely positioning an optical fiber, the microactuator comprising:
    an alignment support structure; and
    a carrier, movably mounted to said alignment support structure, for holding the optical fiber in a fixed relation thereto, said carrier including at least one actuator which deflects in a predetermined direction in response to a predetermined stimulus such that said actuator is operably urged against a portion of said alignment support structure to thereby move said carrier in a direction opposite the predetermined direction in which said actuator is deflected such that said carrier is controllably located relative to said alignment support structure and the optical fiber is precisely positioned, wherein said actuator comprises a comb structure which deflects in the predetermined direction in response to thermal stimuli, and wherein said comb structure comprises:
    a plurality of bimorphic members disposed to deflect in the same predetermined direction in response to thermal stimuli; and means for heating said plurality of bimorphic members such that said bimorphic members deflect to thereby controllably position said carrier relative to said alignment support structure.

14. A microactuator according to claim 13 wherein said plurality of bimorphic members are spaced apart and extend in a parallel relationship, and wherein said heating means extends between adjacent ones of said bimorphic members.

15. A microactuator according to claim 14 wherein said heating means comprises a circuitous thin film heater which extends between adjacent ones of said bimorphic members.

16. A microactuator according to claim 13 wherein each bimorphic member is comprised of a plurality of material layers, and wherein at least one of the material layers is comprised of a shape memory alloy material.

17. A microactuator according to claim 13 wherein a central portion of each bimorphic member includes an outwardly extending protuberance for contacting said alignment support structure.

18. A microactuator for precisely positioning an optical fiber, the microactuator comprising:
  an alignment support structure; and
  a carrier, movably mounted to said alignment support structure, for holding the optical fiber in a fixed relation thereto, said carrier including at least one actuator which deflects in a predetermined direction in response to a predetermined stimulus such that said actuator is operably urged against a portion of said alignment support structure to thereby move said carrier in a direction opposite the predetermined direction in which said actuator is deflected such that said carrier is controllably located relative to said alignment support structure and the optical fiber is precisely positioned,
  wherein said actuator comprises an asymmetric monomorph having first and second portions defining first and second resistances, respectively, and wherein the first and second resistances defined by said first and second portions, respectively, are unequal such that said asymmetric monomorph deflects in the predetermined direction in response to the predetermined stimulus.

19. A microactuator according to claim 18 wherein said asymmetric monomorph is a U-shaped structure, wherein the first and second portions of said asymmetric monomorph form opposite legs of the U-shaped structure, and wherein the first and second portions of said asymmetric monomorph have different cross-sectional areas which at least partially define the first and second resistances, respectively.

20. A microactuator according to claim 19 wherein the second portion of said asymmetric monomorph has a larger cross-sectional area than the first portion of said asymmetric monomorph, and wherein said asymmetric monomorph is disposed such that the second portion is closer to said alignment support structure than the first portion such that said asymmetric monomorph deflects in a direction toward said alignment support structure in response to the predetermined stimulus.

21. A microactuator for precisely positioning an optical fiber, the microactuator comprising:
  a carrier comprising a carrier body for receiving the optical fiber and for maintaining the optical fiber in a fixed relation relative to said carrier; and
  at least one actuator comprising first and second elongate actuator portions extending from respective end portions which are affixed to said carrier body to opposed distal portions that are spaced apart from one another, wherein both said first and second actuator portions deflect in the same predetermined direction in response to a predetermined type of stimulus to thereby controllably locate said carrier such that the optical fiber is precisely positioned.

22. A microactuator according to claim 21 wherein each respective actuator portion comprises an asymmetric monomorph having first and second portions defining first and second resistances, respectively, and wherein the first and second resistances defined by said first and second portions, respectively, are unequal such that said asymmetric monomorph deflects in the predetermined direction in response to electrical stimuli.

23. A microactuator according to claim 22 wherein said asymmetric monomorph is a U-shaped structure, wherein the first and second portions of said asymmetric monomorph form opposite legs of the U-shaped structure, and wherein the first and second portions of said asymmetric monomorph have different cross-sectional areas which at least partially define the first and second resistances, respectively.

24. A microactuator according to claim 21 wherein each respective actuator portion is a bimorphic actuator comprised of first and second layers comprising first and second materials, respectively, and having first and second coefficients of thermal expansion, respectively, such that the first and second materials differentially expand in response to thermal stimuli to thereby deflect said bimorphic actuator.

25. A microactuator according to claim 21 wherein each respective actuator portion is comprised of a plurality of material layers, and wherein at least one of the material layers is comprised of a shape memory alloy material which deflects in response to thermal stimuli.

26. A microactuator according to claim 21 further comprising means for heating said first and second actuator portions such that said first and second actuator portions deflect to thereby controllably locate said carrier.

27. A microactuator according to claim 26 wherein said heating means comprises first and second thin film heaters disposed upon said carrier for thermally stimulating said first and second actuator portions, respectively.

28. A microactuator for precisely positioning an optical fiber, the microactuator comprising:
  an alignment support structure; and
  a carrier, movably mounted to said alignment support structure, for holding the optical fiber in a fixed relation thereto,
  wherein said alignment support structure comprises at least one actuator which deflects in a predetermined direction in response to a predetermined stimulus such that said actuator is operably urged against a portion of said carrier such that further deflection of said at least one actuator in the predetermined direction moves said carrier in the predetermined direction in which the actuator is deflected such that said carrier is controllably located relative to said alignment support structure and the optical fiber is precisely positioned.

29. A microactuator according to claim 28 wherein said actuator comprises a diaphragm which deflects in the predetermined direction in response to the predetermined stimulus.

30. A microactuator according to claim 29 wherein said diaphragm is comprised of material selected from the group consisting of piezoelectric material and shape memory alloy material.

31. A microactuator according to claim 30 wherein said actuator comprises a comb structure which deflects in the predetermined direction in response to thermal stimuli, and wherein said comb structure comprises:

a plurality of bimorphic members disposed to deflect in the same predetermined direction in response to thermal stimuli; and means for heating said plurality of bimorphic members such that said bimorphic members deflect to thereby controllably position said carrier relative to said alignment support structure.

32. A microactuator according to claim 31 wherein said plurality of bimorphic members are spaced apart and extend in a parallel relationship, and wherein said heating means extends between adjacent ones of said bimorphic members.

33. A microactuator according to claim 32 wherein said heating means comprises a circuitous thin film heater which extends between adjacent ones of said bimorphic members.

34. A microactuator according to claim 31 wherein each bimorphic member is comprised of a plurality of material layers, and wherein at least one of the material layers is comprised of a shape memory alloy material.

35. A microactuator according to claim 31 wherein a central portion of each bimorphic member includes an outwardly extending protuberance for contacting said carrier.

36. A method of precisely positioning an optical fiber, the method comprising the steps of:

mounting a carrier on an alignment support structure, wherein the carrier includes at least one actuator;

disposing the optical fiber in a fixed position relative to the carrier; and deflecting the actuator in a predetermined direction, wherein said deflecting step comprises the steps of:

deflecting the actuator into operable contact with a portion of the alignment support structure; and further deflecting the actuator in the predetermined direction so as to move the carrier in a direction opposite the predetermined direction in which the actuator is deflected such that the carrier is controllably positioned relative to the alignment support structure and the optical fiber is precisely positioned.

37. A method according to claim 36 wherein said deflecting step comprises electrically stimulating the actuator to thereby deflect the actuator in the predetermined direction.

38. A method of precisely positioning an optical fiber, the method comprising the steps of:

mounting a carrier on an alignment support structure, wherein the carrier includes at least one actuator;

disposing the optical fiber in a fixed position relative to the carrier; and deflecting the actuator in a predetermined direction, wherein said deflecting step comprises operably urging the actuator against a portion of the alignment support structure to thereby move the carrier in a direction opposite the predetermined direction in which the actuator is deflected such that the carrier is controllably positioned relative to the alignment support structure and the optical fiber is precisely positioned, wherein said deflecting step comprises thermally stimulating the actuator to thereby deflect the actuator in the predetermined direction.

39. A method of precisely positioning an optical fiber, the method comprising the steps of:

mounting a carrier on an alignment support structure, wherein the alignment support structure includes at least one actuator;

disposing the optical fiber in a fixed position relative to the carrier; and deflecting the actuator in a predetermined direction, wherein said deflecting step comprises the steps of:

deflecting the actuator into operable contact with a portion of the carrier; and further deflecting the actuator in the predetermined direction so as to move the carrier in the predetermined direction in which the actuator is deflected such that the carrier is controllably positioned relative to the alignment support structure and the optical fiber is precisely positioned.

40. A method according to claim 39 wherein said deflecting step comprises electrically stimulating the actuator to thereby deflect the actuator in the predetermined direction.

41. A method of precisely positioning an optical fiber, the method comprising the steps of:

mounting a carrier on an alignment support structure, wherein the alignment support structure includes at least one actuator;

disposing the optical fiber in a fixed position relative to the carrier; and deflecting the actuator in a predetermined direction, wherein said deflecting step comprises operably urging the actuator against a portion of the carrier to thereby move the carrier in the predetermined direction in which the actuator is deflected such that the carrier is controllably positioned relative to the alignment support structure and the optical fiber is precisely positioned, wherein said deflecting step comprises thermally stimulating the actuator to thereby deflect the actuator in the predetermined direction.

* * * * *